United States Patent
Saylor et al.

(10) Patent No.: US 10,021,106 B1
(45) Date of Patent: *Jul. 10, 2018

(54) LOGGING LOCATION AND TIME DATA ASSOCIATED WITH A CREDENTIAL

(71) Applicant: MicroStrategy Incorporated, Vienna, VA (US)

(72) Inventors: Michael J. Saylor, Vienna, VA (US); Gang Chen, Vienna, VA (US)

(73) Assignee: MicroStrategy Incorporated, Vienna, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,126

(22) Filed: Mar. 24, 2016

Related U.S. Application Data

(63) Continuation of application No. 13/848,196, filed on Mar. 21, 2013, now Pat. No. 9,300,646.

(Continued)

(51) Int. Cl.

| | |
|---|---|
| *H04L 29/06* | (2006.01) |
| *G07C 9/00* | (2006.01) |
| *G07C 1/10* | (2006.01) |
| *G06Q 10/06* | (2012.01) |
| *H04W 4/02* | (2018.01) |
| *G06Q 10/10* | (2012.01) |

(52) U.S. Cl.
CPC ............. *H04L 63/10* (2013.01); *G06Q 10/06* (2013.01); *G06Q 10/1091* (2013.01); *G07C 1/10* (2013.01); *G07C 9/00087* (2013.01); *G07C 9/00158* (2013.01); *H04L 63/08* (2013.01); *H04L 63/107* (2013.01); *H04W 4/02* (2013.01)

(58) Field of Classification Search
CPC ....... H04L 63/10; H04L 63/08; H04L 63/107; H04W 4/02; G06Q 10/1091; G06Q 10/06; G07C 9/00087; G07C 1/10; G07C 9/00158

See application file for complete search history.

(56) References Cited

U.S. PATENT DOCUMENTS

| | | | | |
|---|---|---|---|---|
| 5,459,657 A | * | 10/1995 | Wynn ................ | G06Q 10/109 705/32 |
| 6,163,697 A | * | 12/2000 | Peterson ............. | H04W 84/08 370/329 |

(Continued)

FOREIGN PATENT DOCUMENTS

JP             2011227619 A    *   11/2011

*Primary Examiner* — Michael Pyzocha
(74) *Attorney, Agent, or Firm* — Fish & Richardson P.C.

(57) ABSTRACT

Location information of a client device associated with a credential is determined to be tracked. The credential has been granted to a user of the client device by a credential granting authority to indicate a status of the user with the credential. Known location data that indicates known locations is maintained. The credential data is associated with each of the known locations, and geographic data for each of the known locations. A location of the client device associated with the credential and a particular time associated with the location is determined. A subset of the known location data that defines one or more locations that are known for the credential is accessed from the known location data. The location of the client device associated with the credential is compared with geographic data included in the accessed subset of the known location data.

18 Claims, 17 Drawing Sheets

Related U.S. Application Data

(60) Provisional application No. 61/789,653, filed on Mar. 15, 2013.

(56) References Cited

U.S. PATENT DOCUMENTS

| | | | |
|---|---|---|---|
| 7,852,196 B1 | 12/2010 | Adams | |
| 8,019,622 B2 | 9/2011 | Kaboff et al. | |
| 8,063,797 B1* | 11/2011 | Sonnabend | G06K 9/00791 |
| | | | 340/932.2 |
| 8,441,367 B1 | 5/2013 | Lee et al. | |
| 8,447,666 B1* | 5/2013 | Keld | G06Q 10/087 |
| | | | 705/16 |
| 8,768,604 B1 | 7/2014 | Klimek | |
| 8,775,807 B1 | 7/2014 | Vazquez | |
| 8,856,916 B1* | 10/2014 | Sobel | G06F 21/62 |
| | | | 726/17 |
| 2001/0047286 A1 | 11/2001 | Walker | |
| 2003/0217122 A1 | 11/2003 | Roese et al. | |
| 2003/0233447 A1 | 12/2003 | Fellenstein et al. | |
| 2004/0059953 A1 | 3/2004 | Purnell | |
| 2004/0066276 A1* | 4/2004 | Gile | G07C 1/10 |
| | | | 340/5.53 |
| 2004/0147252 A1 | 7/2004 | Strom | |
| 2004/0267595 A1* | 12/2004 | Woodings | G06Q 10/06 |
| | | | 705/7.14 |
| 2005/0021459 A1 | 1/2005 | Bell | |
| 2006/0099969 A1* | 5/2006 | Staton | G08B 21/0211 |
| | | | 455/456.4 |
| 2006/0174329 A1* | 8/2006 | Dublish | H04W 8/16 |
| | | | 726/4 |
| 2006/0179056 A1 | 8/2006 | Rosenberg | |
| 2007/0067642 A1* | 3/2007 | Singhal | G06F 21/32 |
| | | | 713/186 |
| 2007/0101438 A1* | 5/2007 | Govindarajan | G06F 21/6218 |
| | | | 726/27 |
| 2007/0130279 A1* | 6/2007 | Thacher | G01C 21/26 |
| | | | 709/208 |
| 2007/0145113 A1* | 6/2007 | Keller | G06K 17/00 |
| | | | 235/377 |
| 2007/0178909 A1* | 8/2007 | Doyle | G01S 5/0027 |
| | | | 455/456.1 |
| 2007/0197233 A1 | 8/2007 | Feng | |
| 2007/0206741 A1* | 9/2007 | Tiliks | H04M 3/2281 |
| | | | 379/106.02 |
| 2008/0114683 A1* | 5/2008 | Neveu | G06Q 10/06 |
| | | | 705/50 |
| 2008/0150751 A1* | 6/2008 | Sala | G01D 4/00 |
| | | | 340/870.02 |
| 2008/0171559 A1* | 7/2008 | Frank | G06Q 30/02 |
| | | | 455/456.5 |
| 2008/0184261 A1* | 7/2008 | Jun | H04L 41/12 |
| | | | 719/313 |
| 2008/0207218 A1* | 8/2008 | Craine | B60R 25/1004 |
| | | | 455/456.1 |
| 2008/0208738 A1 | 8/2008 | Mathew | |
| 2008/0251077 A1 | 10/2008 | Durtschi et al. | |
| 2008/0255919 A1* | 10/2008 | Gorder | G06Q 10/06 |
| | | | 705/7.13 |
| 2009/0075677 A1 | 3/2009 | Seger et al. | |
| 2009/0086936 A1* | 4/2009 | Clifford | G07C 1/10 |
| | | | 379/88.13 |
| 2009/0204434 A1* | 8/2009 | Breazeale, Jr. | G06F 19/327 |
| | | | 705/3 |
| 2009/0213001 A1* | 8/2009 | Appelman | H04L 12/581 |
| | | | 342/357.59 |
| 2010/0082491 A1 | 4/2010 | Rosenblatt et al. | |
| 2010/0153171 A1* | 6/2010 | Erhart | G06Q 10/06 |
| | | | 705/7.18 |
| 2010/0179853 A1* | 7/2010 | Garcia | G06Q 10/06 |
| | | | 705/7.12 |
| 2010/0184408 A1 | 7/2010 | Vendrow et al. | |
| 2010/0211996 A1* | 8/2010 | McGeehan | G06F 21/316 |
| | | | 726/4 |
| 2010/0287025 A1* | 11/2010 | Fletcher | G06Q 10/06 |
| | | | 705/7.15 |
| 2010/0312605 A1* | 12/2010 | Mitchell | G06Q 10/06 |
| | | | 705/7.13 |
| 2011/0320230 A1* | 12/2011 | Podgurny | G06Q 10/06 |
| | | | 705/7.13 |
| 2012/0028635 A1 | 2/2012 | Borg et al. | |
| 2012/0161971 A1* | 6/2012 | Nasir | G07C 1/10 |
| | | | 340/573.4 |
| 2012/0233044 A1 | 9/2012 | Burger | |
| 2012/0238286 A1 | 9/2012 | Mallavarapu et al. | |
| 2012/0246039 A1 | 9/2012 | Fain et al. | |
| 2012/0278211 A1* | 11/2012 | Loveland | G07C 1/10 |
| | | | 705/32 |
| 2012/0296672 A1 | 11/2012 | Bates et al. | |
| 2013/0018792 A1* | 1/2013 | Casey | G06Q 20/35785 |
| | | | 705/44 |
| 2013/0018826 A1 | 1/2013 | Sundararajan | |
| 2013/0048720 A1* | 2/2013 | Lewis | G06Q 10/00 |
| | | | 235/382 |
| 2013/0055370 A1* | 2/2013 | Goldberg | G06F 21/31 |
| | | | 726/7 |
| 2013/0088324 A1 | 4/2013 | Morley | |
| 2013/0090964 A1* | 4/2013 | Rivere | G06Q 30/00 |
| | | | 705/7.13 |
| 2013/0090968 A1* | 4/2013 | Borza | G06Q 10/06 |
| | | | 705/7.16 |
| 2013/0122882 A1* | 5/2013 | Patel | H04L 41/0886 |
| | | | 455/418 |
| 2013/0157655 A1* | 6/2013 | Smith, II | H04W 88/06 |
| | | | 455/426.1 |
| 2013/0225161 A1 | 8/2013 | Chhabra et al. | |
| 2013/0231129 A1 | 9/2013 | Saville | |
| 2013/0246785 A1 | 9/2013 | Buckley et al. | |
| 2013/0268418 A1 | 10/2013 | Sardi et al. | |
| 2013/0314210 A1* | 11/2013 | Schoner | G06K 7/10366 |
| | | | 340/8.1 |
| 2013/0325494 A1 | 12/2013 | Angel | |
| 2014/0006207 A1 | 1/2014 | Koelling et al. | |
| 2014/0012591 A1 | 1/2014 | Kaboff | |
| 2014/0032705 A1 | 1/2014 | Williams et al. | |
| 2014/0040129 A1* | 2/2014 | Akin | G06Q 20/4037 |
| | | | 705/44 |
| 2014/0055231 A1 | 2/2014 | Amron | |
| 2014/0057596 A1* | 2/2014 | Brill | H04L 63/126 |
| | | | 455/410 |
| 2014/0075493 A1 | 3/2014 | Krishnan et al. | |
| 2014/0099921 A1* | 4/2014 | Weiss | H04W 12/08 |
| | | | 455/411 |
| 2014/0114824 A1* | 4/2014 | Kong | G06Q 10/1091 |
| | | | 705/32 |
| 2014/0118154 A1* | 5/2014 | Grounds | G06Q 10/20 |
| | | | 340/686.1 |
| 2014/0214471 A1 | 7/2014 | Schreiner, III | |
| 2014/0227673 A1 | 8/2014 | Yousef | |
| 2014/0266642 A1 | 9/2014 | Girardeau et al. | |
| 2014/0269491 A1 | 9/2014 | Edge | |
| 2014/0282927 A1 | 9/2014 | McLaughlin et al. | |

* cited by examiner

| Location Name | Geographic Coordinates | Associated Credentials |
|---|---|---|
| Customer #1 | +37.173281, -101.369564 | Repair Group and Employee J |
| Customer #2, Site #1 | +37.929346, -100.129875 | All Employees |
| Customer #2, Site #2 | +39.021584, -99.348845 | Repair Group |
| Supplier #1 | +36.09782, -100.763456 | Employee X |
| Supplier #2 | +38.987156, -100.573159 | Employees A, B, C, M, Q, and R |
| Corporate HQ | +38.552891, 99.523847 | All Employees |

FIG. 10

LOGGING LOCATION AND TIME DATA ASSOCIATED WITH A CREDENTIAL

CROSS-REFERENCE TO RELATED APPLICATIONS

This application is a continuation (and claims the benefit of priority under 35 USC 120) of U.S. application Ser. No. 13/848,196, filed Mar. 21, 2013, now allowed, which claims the benefit of U.S. Provisional Application Ser. No. 61/789,653, titled Logging Location and Time Data Associated with a Credential, and filed on Mar. 15, 2013. Both of these prior applications are incorporated by reference in their entirety.

TECHNICAL FIELD

This disclosure relates to logging location and time data associated with credentials.

BACKGROUND

Organizations may issue credentials to persons, for example, to uniquely identify each person. Persons may use the credentials to identify themselves.

SUMMARY

In general, one innovative aspect of the subject matter described in this specification can be embodied in methods that include the actions of determining to track location information of a client device associated with a credential, the credential having been granted to a user of the client device by a credential granting authority to indicate a status of the user with the credential granting authority; maintaining known location data that indicates known locations, credential data associated with each of the known locations, and geographic data for each of the known locations; determining a location of the client device associated with the credential and a particular time associated with the location; accessing, from the known location data, a subset of the known location data that defines one or more locations that are known for the credential; comparing the location of the client device associated with the credential with geographic data included in the accessed subset of the known location data; based on the comparison, determining that the location of the client device associated with the credential matches geographic data for a particular known location included in the accessed subset of the known location data; and based on the determination that the location of the client device associated with the credential matches geographic data for the particular known location, generating a log entry that indicates that the credential arrived at the particular known location at the particular time. Other embodiments of this aspect include corresponding systems, apparatus, and computer programs, configured to perform the actions of the methods, encoded on computer storage devices.

These and other embodiments can each optionally include one or more of the following features. The actions further include detecting that the client device associated with the credential has left the particular known location at a later time; and determining an amount of time that the client device associated with the credential was at the particular known location based on the particular time and the later time. The action of generating the log entry includes generating a log entry that indicates presence of the credential at the particular known location for the determined amount of time. Generating the log entry occurs on the client device. Generating the log entry occurs on a server system that is located remote from the client device.

The actions further include accessing locations of the client device tracked by the client device over a period of time during which the client device lost connectivity with the server system, the accessed locations having been cached on the client device with time information for the period of time during which the client device lost connectivity with the server system; comparing the accessed locations of the client device with geographic data included in the accessed subset of the known location data; and based on the comparison of the accessed locations of the client device with geographic data included in the accessed subset of the known location data, determining which of the accessed locations of the client device matches a known location included in the accessed subset of the known location data.

The action of generating the log entry includes generating log entries that indicate presence of the credential at known locations within the period of time during which the client device lost connectivity with the server system based on the determination of which of the accessed locations of the client device matches a known location included in the accessed subset of the known location data. The actions further include determining a new location of the client device associated with the credential and a new time associated with the new location; comparing the new location of the client device associated with the credential with geographic data included in the accessed subset of the known location data; based on the comparison of the new location with geographic data included in the accessed subset of the known location data, determining that the new location of the client device associated with the credential is unknown; and based on the determination that the new location of the client device associated with the credential is unknown, sending a warning message. The action of sending the warning message includes sending the warning message to the client device.

The action of sending the warning message includes identifying another client device that is associated with the credential granting authority and sending the warning message to the identified client device. The action of sending the warning message includes identifying a supervisor credential that was issued by the credential granting authority and that identifies a supervisor of the user, the credential granting authority being an employer of the user and the supervisor; based on the supervisor credential, identifying a supervisor client device that is associated with the supervisor; and based on identifying the supervisor credential and the supervisor client device, sending the warning message to the supervisor client device.

The action of sending the warning message includes determining a difference between the new time and a time when the client device associated with the credential was last determined to be at a known location; comparing the difference to a threshold period of time; determining that the difference exceeds the threshold period of time based on the comparison of the difference to the threshold period of time; and sending the warning message based on the determination that the difference exceeds the threshold period of time. The action of generating the log entry includes generating a log entry that indicates presence of the credential at an unknown location at the new time. The action of determining a location of the client device associated with the credential and a particular time associated with the location includes receiving data indicating the credential has been activated by the client device; and automatically receiving data indicating the location of the client device and the particular time associated with the location.

The action of determining a location of the client device associated with the credential and a particular time associated with the location includes receiving, by a server system, data indicating the credential has been activated by the client device; determining, by the server system, that data indicating the location of the client device has not been received from the client device for more than a threshold period of time; and based on the determination that data indicating the location of the client device has not been received from the client device for more than a threshold period of time, polling, by the server system, the client device associated with the credential.

The action of determining a location of the client device associated with the credential and a particular time associated with the location includes receiving, by a server system, data indicating the credential has been activated by the client device; determining, by the server system, that data indicating the location of the client device has not been received from the client device for more than a threshold period of time; and based on the determination that data indicating the location of the client device has not been received from the client device for more than a threshold period of time, sending, by the server system, data that elicits a response from the client device.

The actions further include based on sending data that elicits a response from the client device, receiving, from the client device, a second location of the client device; determining a second, different particular time associated with the second location; comparing the second location of the client device associated with the credential with geographic data included in the accessed subset of the known location data; based on the comparison of the second location, determining that the second location of the client device associated with the credential matches geographic data for a second, different particular known location included in the accessed subset of the known location data; and based on the determination that the second location of the client device associated with the credential matches geographic data for the second, different particular known location included in the accessed set of the known location data, generating a second log entry to indicate the presence of the credential at the second, different particular known location at the second, different particular time.

The action of maintaining known location data includes maintaining association data that defines each of the known locations as being associated with one or more credentials. The action of accessing the subset of the known location data that is associated with the credential includes analyzing the credential with respect to the association data that defines each of the known locations as being associated with one or more credentials; based on the analysis, identifying a subset of the known location data that is associated with the credential; and accessing the identified subset of the known location data. The actions further include maintaining, by a server system, data indicative of credentials held by multiple different users, each of the credentials having been issued by a credential granting authority that is separate from an entity that operates the server system; and enabling tracking of locations of client devices of each of the multiple different users that hold the credentials and enabling generation of logs of tracked locations for each of the credentials based on tracked locations. The subset of the known location data that defines one or more locations that are known for the credential was defined by the credential granting authority.

In general, another aspect of the subject matter described in this specification can be embodied in methods that include the actions of determining to track location information of a client device associated with a credential, the credential having been granted to a user of the client device by a credential granting authority to indicate a status of the user with the credential granting authority; setting a first known location for the credential based on input provided by the credential granting authority; setting a second known location for the credential based on input provided by the credential granting authority, the second known location being different than the first known location; determining a first location of the client device associated with the credential and a first time that the client device arrived at the first location; determining that the first location matches the first known location for the credential; based on the determination that the first location matches the first known location for the credential, logging that the client device associated with the credential arrived at the first known location at the first time; determining a second time at which the client device associated with the credential left the first known location; based on the determination of the second time at which the client device associated with the credential left the first known location, logging that the client device associated with the credential left the first known location at the second time; determining a second location of the client device associated with the credential and a third time that the client device arrived at the second location; determining that the second location matches the second known location for the credential; based on the determination that the second location matches the second known location for the credential, logging that the client device associated with the credential arrived at the second known location at the third time; determining a fourth time at which the client device associated with the credential left the second known location; based on the determination of the fourth time at which the client device associated with the credential left the second known location, logging that the client device associated with the credential left the second known location at the fourth time; determining a first amount of time that the client device associated with the credential was located at the first known location based on the logging of the first time and the second time; determining a second amount of time that the client device associated with the credential was located at the second known location based on the logging of the third time and the fourth time; and outputting a log that reflects the first amount of time that the client device associated with the credential was located at the first known location and the second amount of time that the client device associated with the credential was located at the second known location. Other embodiments of this aspect include corresponding systems, apparatus, and computer programs, configured to perform the actions of the methods, encoded on computer storage devices.

In general, another aspect of the subject matter described in this specification can be embodied in methods that include the actions of determining to track location information of a client device associated with a credential, the credential having been granted to a user of the client device by an employer to indicate that the user is an employee of the employer; maintaining known customer site data that indicates known customer sites associated with the credential and geographic data for each of the known customer sites; determining a first location of the client device associated with the credential; comparing the first location of the client device associated with the credential with geographic data included in the known customer site data; based on the comparison of the first location of the client device associated with the credential with geographic data included in the known customer site data, determining that the first location of the client device associated with the credential matches geographic data for a particular customer site included in the known customer site data; determining that the client device associated with the credential has left the particular customer site; based on the determination that the client device associated with the credential has left the particular customer site, generating at least one log entry that reflects a first amount of time that the client device associated with the credential spent at the particular customer site and continuing to monitor the location of the client device associated with the credential against the known customer site data; based on the continued monitoring of the location of the client device associated with the credential against the known customer site data, determining a second amount of time that the client device associated with the credential has not been located at a known customer site included in the known customer site data; comparing the second amount of time to a threshold amount of time used to trigger sending of warning messages related to employees not being located at known customer sites; based on comparing the second amount of time to the threshold amount of time, determining that the second amount of time meets the threshold amount of time; and based on the determination that the second amount of time meets the threshold amount of time, sending a warning message that indicates that the client device associated with the credential has not been located at a known customer site for at least the threshold amount of time. Other embodiments of this aspect include corresponding systems, apparatus, and computer programs, configured to perform the actions of the methods, encoded on computer storage devices.

The details of one or more implementations are set forth in the accompanying drawings and the description, below. Other potential features of the disclosure will be apparent from the description and drawings, and from the claims.

BRIEF DESCRIPTION OF THE DRAWINGS

FIG. 10 illustrates an example set of known location data.

DETAILED DESCRIPTION

Figure 1:
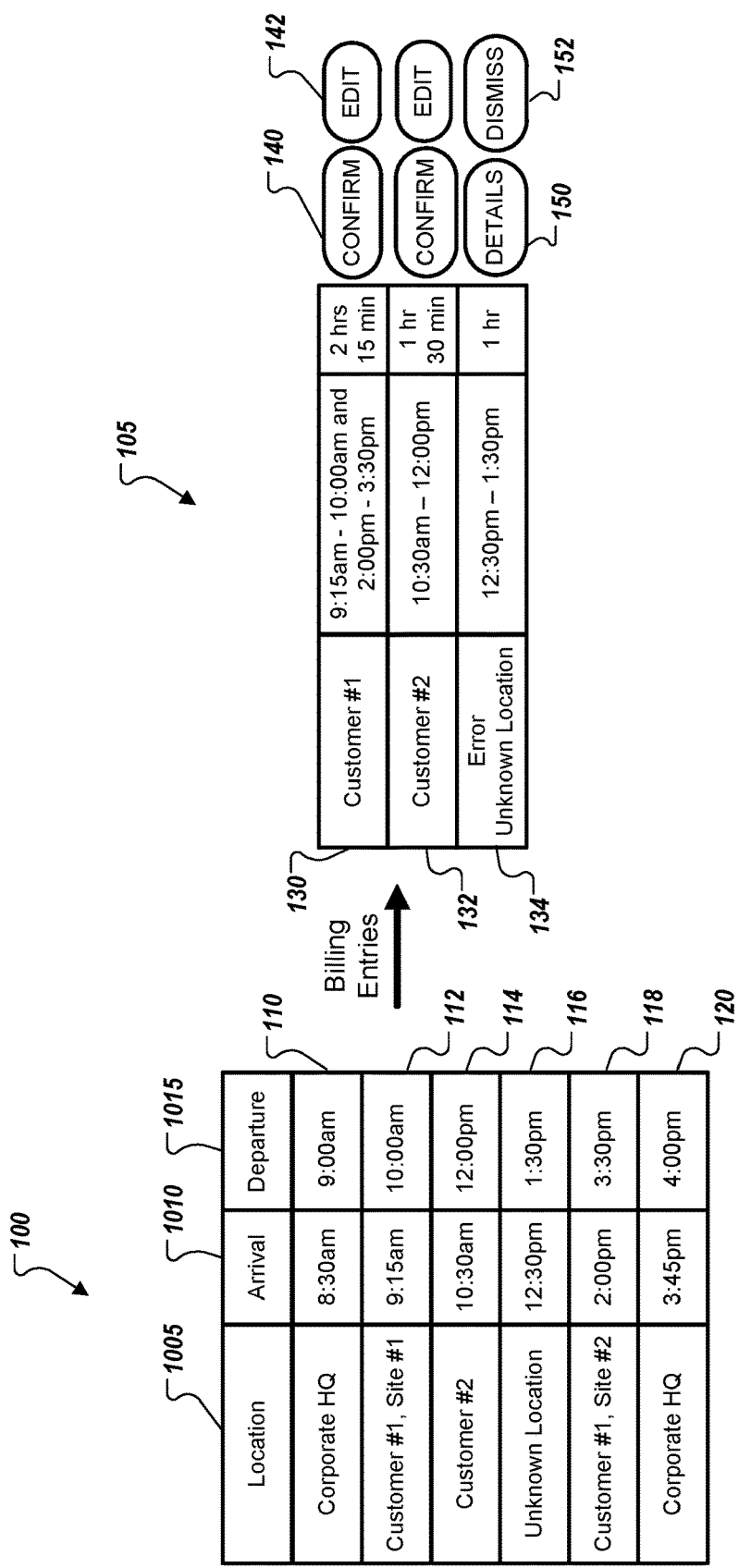
FIG. 1 illustrates an example of an automatically generated time card and associated billing entries.

Techniques are described for generating activity logs that track the location of a client device in association with credential information accessible via the client device. The credential information may represent one or more credentials that a user has been granted by one or more credential granting authorities. For instance, the credentials may be licenses issued by government organizations (e.g., a driver's license, a license to practice medicine, etc.), degrees issued by institutes of learning (e.g., a collegiate degree issued by a university), a status denoting membership in a particular group (e.g., a badge of membership in a non-profit or charitable organization), an employee badge (e.g., an employee identification issued by an employer), or any type of credential an institute bestows on individuals. The credential information may be managed by a system operated by an entity that is separate from the credential granting authorities. The system may verify accuracy of credentials that are managed by the system by coordinating with the credential granting authorities and receiving the credentials from the credential granting authorities. Furthermore, the system may track the location of a client device associated with a credential, determine periods of time in which the location of the client device matches a known location defined for the credential, and generate log entries that describe the periods of time in which the location of the client device matches a known location defined for the credential.

In some implementations, a mobile device-based credential management application enables a user to hold (or otherwise access) multiple different credentials on the user's client device. One or more of these credentials may be configured to be "activated" by the user to transpond information about the location of the credential holder to a server.

In some examples, each credential is associated with a group of known locations (e.g., location data stored in a database in association with the credential or the credential type of the credential). A known location may be a specific geographic location and include information descriptive of the business or person who is located at the specific geographic location. For example, 36.8940° N, 79.0360° W may be the location of Customer #9. The server may compare the transponded location information to records of known locations for that credential to generate a log of locations from which the client device with the activated credential transponded location information. In an example where the user is an employee of a company who has activated an employee credential issued by the company to transpond location data, the server may compare location information transponded by the employee's client device to locations known to be associated with customers of the company to generate a log of customer locations visited by the employee. Taking this example one step further, the server then may use the log of customer locations visited by the employee to generate billing entries or invoices for the corresponding customers based on the amount of time the employee spent at the customers' sites. In another example, such a system may be useful for delivery companies. The delivery company may assign each delivery employee a credential. The employee could set his credential to transpond during the delivery day. The server would then compile a log of the delivery locations visited by the employee. In another example, the system may be useful for service companies. The service company could assign each service technician a credential. The credential would transpond the location of the service technician during the work day, and the system would automatically generate a log of the locations visited by the service technician.

FIG. 1 illustrates an example of an automatically generated time card and associated billing entries. In the example shown in FIG. 1, a computer system generated a log 100 and corresponding billing entries 105 for a user who holds a particular credential. The user may be an employee of an employer who operates the computer system. For example, the employee may be a consultant who travels to customer sites to provide consulting services to customers of the employer, and the employer may bill customers for time the employee spends providing consultant services while on site. Furthermore, the employer may have leveraged a credential management application to issue an employee credential to the employee that is accessible via a client device associated with the employee. The employee credential can be activated to cause the client device from which the employee credential is accessible to transpond information about the location of the client device to the computing system. The computing system then can use the location information transponded by the client device to track the location of the employee's client device (and, by extension, the employee) and to generate billing data for consulting services provided by the employee while visiting different customer sites. For example, using the location information transponded by the client device, the computer system may generate a log 100 of locations visited by the employee's client device (and, by extension, the employee) and the amount of time spent at the tracked locations. In so doing, the computer system may compare locations visited by the employee's client device with known locations that are associated with the employee's employee credential (e.g., known locations of customer sites). When the computer system determines that a location visited by the employee's client device matches a known location associated with the employee's employee credential, the computer system may record the known location in the log 100. Based on the log 100, the computer system then may generate a list of billing entries 105 that may be used to invoice the customers to whom the employee provided consulting services.

As illustrated in FIG. 1, Entry 110 in the log 100 indicates that, between 8:30 am and 9:00 am, the employee was located at the employer's corporate headquarters. The computer system may have determined that the employee was located at the employer's corporate headquarters during this time period based on location information transponded by the employee's client device from which the employee's employee credential is accessible. For example, between 8:30 am and 9:00 am, the employee's client device may have transmitted, at particular intervals, data identifying a first location to the computer system. The computer system may have compared the first location to a database of known locations and determined that the first location corresponded to the corporate headquarters of the employer. The computer system then may have generated log entry 110 describing the employee's location as "Corporate HQ," arrival at "8:30 am," and departure at "9:00 am." The computing system also may have followed a similar process to generate log entries 112, 114, 116, 118, and 120.

In some implementations, when generating a location-tracking log, such as, for example, log 100, the computer system may disregard times when the client device stayed in locations for only a short period of time. For example, in generating log 100, the computer system disregarded the time between 9:00 am and 9:15 am, the time between 10:00 am and 10:30 am, the time between 12:00 pm and 12:30 pm, the time between 1:30 pm and 2:00 pm, and the time between 3:30 pm and 3:45 pm. The disregarded times may represent times during which the employee was traveling between particular known locations. For example, between 9:00 am and 9:15 am, the employee may have been traveling between Corporate HQ and Customer #1, Site #1. Depending on the frequency of transmission of location information by the client device of the location, each location reported within that time period may have been different. In some other implementations, the client device may be configured to transpond its location to the computer system only in response to detecting that its location has changed significantly. For example, the client device only may transpond its location to the computer system only in response to detecting that the location of the client device has changed by more than some pre-defined distance (e.g., 100 yards, a quarter mile, etc.). Additionally or alternatively, the client device only may transpond its location to the computer system in response to detecting that the client device is communicating with a different cell tower. In such implementations, the computer system may process the log based on all of the client device location updates received from the client device.

As illustrated in FIG. 1, after generating log 100, the computer system may convert the log 100 into billing entries 105. In some implementations, the computer system analyzes each log entry, determines if each log entry represents billable time, and converts each log entry determined to represent billable time into a corresponding billing entry. For example, the computer system analyzes log entry 110 and determines that, since the location of the client device and, thus, the employee, is at Corporate HQ, the employee's time for log entry 110 is not billable. As a second example, the computer system analyzes log entry 114, determines that the employee was at a customer site corresponding to Customer #2 for one hour and thirty minutes, and generates a billing entry 132 indicating the customer, the time period during which the employee as at the customer site, and the elapsed time that the employee spent at the customer site.

In some implementations, the system combines log entries that share common customers. For example, the computer system analyzes log entries 112 and 118 and determines that they both correspond to Customer #1, even though the locations recorded in log entries 112 and 118 are different. The computer system generates billing entry 130 indicating that the employee was at customer sites corresponding to Customer #1 for two hours and fifteen minutes.

In some implementations, the computer system analyzes billing entries and generates a billing entry even though the log entry does not identify a customer. For example, the computer system analyzes log entry 116 and determines that the employee was at an unknown location for one hour (e.g., based on having been unable to identify a record in the database that matched the location information transponded by the employee's client device for this time period). The computer system generates billing entry 134 indicating an error because the location was not known by the database.

A computing device may display the billing entries 105 in an interface with buttons 140, 142, 150, and 152. An employer or employee may interact with the interface to review and edit the displayed billing entries. Selecting the confirm button 140 may allow an employer or employee to confirm that the associated billing entry should be included in an invoice to the customer. Selecting the edit button 142 may allow an employer or employee to adjust the associated billing entry before invoicing the customer. Selecting the details button 150 may allow an employer or employee to view more data corresponding to the associated billing entry. The data may include a view of the location referenced by the billing entry on a map or the history of credentials at the location. Selecting the dismiss button 152 may allow an employer or employee to disregard the associated billing entry and not invoice the client.

Figure 2:
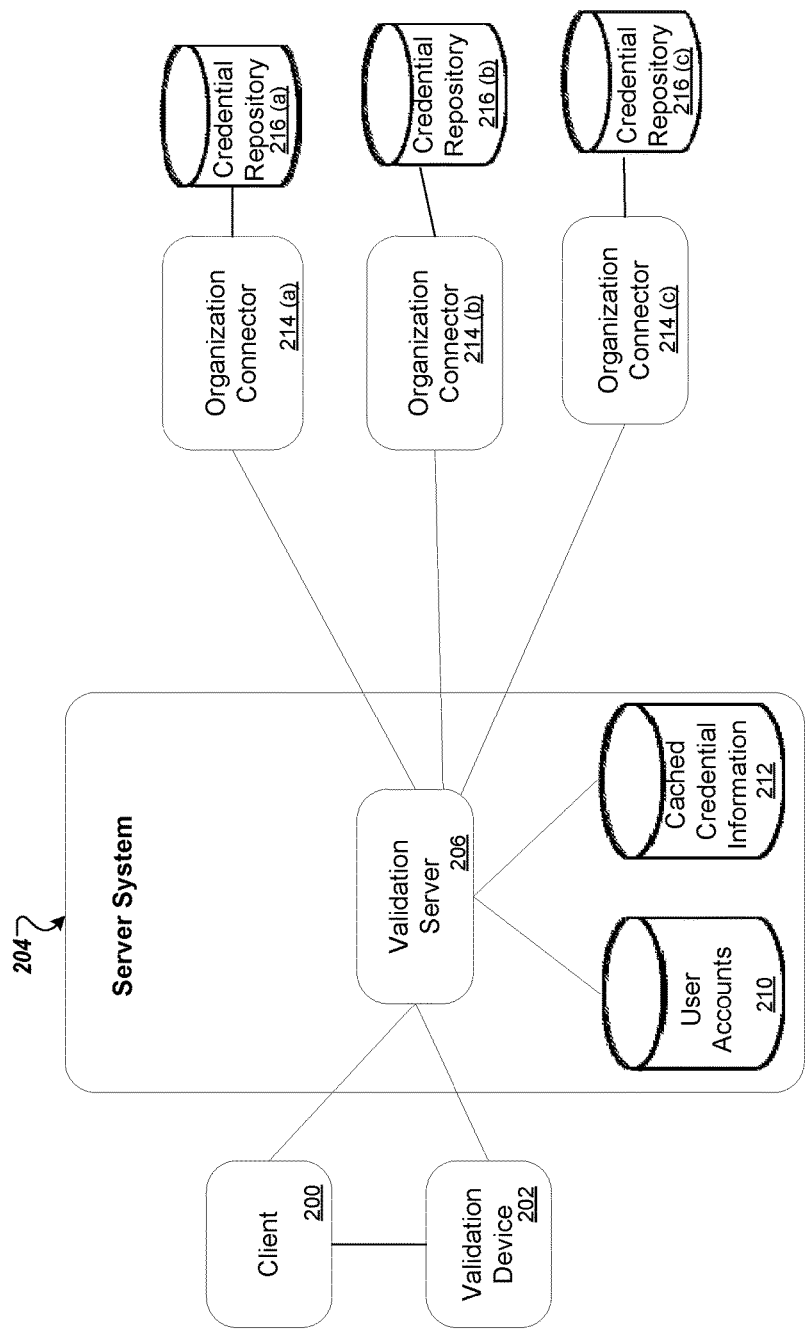
FIG. 2 is a block diagram illustrating an example of a communications system.

FIG. 2 illustrates an example of a credential managing system. As illustrated in FIG. 2, the system includes a client device 200, a validation device 202, and a server system 204. The client device 200 and the validation device 202 each operate a mobile device-based credential management application. The validation device is a client device that, for illustrative and exemplary purposes, is used to validate the credential of another user. The client device 200 and the validation device 202 may include any electronic device that is capable of communicating with the server system 204 including, but not limited to, a mobile phone, smart phone, personal digital assistant (PDA), electronic book (e-book) reader, tablet computer, laptop, or other device that includes one or more processors and non-transitory computer readable storage media. The credential management application is in communication with the server system 204. The credential management application acts as a platform for managing credentials issued to multiple, different users by various credential issuing organizations.

For example, as shown, the credential management application operated on the client device 200 may receive, from the server system 204, credential information for a first user that operates the client device 200. In this example, and as described in greater detail below, the credential management application operated on the client device 200 may provide credential information to the credential management application operated on the validation device 202 for proposes of verifying, to a second user who operates the validation device 202, that the first user holds one or more credentials represented by the credential information. In this example, the credential management application operated on the validation device 202 receives the credential information and communicates with the server system 204 to validate that the first user holds the one or more credentials represented by the credential information.

The server system 204 includes a validation server 206, an account data store 210, and a credential data store 212. The validation server 206 is involved in the process of validating credential issuing organizations as well as validation of credentials. The validation server 206 authenticates credential issuing organizations that would like to make credentials available to users of the credential management system. The validation server 206 also validates credentials held by users of the credential management system through communication with credential management applications operated on user devices.

The account data store 210 stores user account information and the credential data store 212 stores credential information associated with user accounts. Customers of the credential management application may set up a user account that allows the user to store personal information as well as the credentials issued to the user. Each user account may include identification information for the user and credential data that defines credentials held by the user. The system 204 may maintain accounts for multiple different users with each user account specific to a user and the credentials held by the specific user. Furthermore, the account data store 210 may store location information associated with each credential. The location information may include logs detailing the location of each credential, when the user associated with the credential activated the credential for logging. The location information may include a list of known locations for each of credential. For example, the list of known locations, or known location database, may be a list of customer sites that the user is assigned to visit.

Credentials (or information related to credentials) issued to a user by a credential issuing organization may be cached in the credential data store 212 until a cache until date associated with the credential passes. The cache until date defines the date that a cached version of the credential may be used without having to communicate with the credential issuing organization to confirm the continued validity of the credential. When the cache until date has not passed, the server system 204 may access, from electronic storage at the server system 204, a cached version of the credential and use the cached version of the credential to send credential information (e.g., send a user an updated list of the user's credentials) or validate the credential (e.g., confirm to another user that the user's credential is valid). When the cache until date has passed, the server system 204 communicates with the credential issuing organization that issued the credential to receive updated credential information for the credential and then sends credential information or validates the credential based on the updated credential information. For example, an employer may define a cache until date of twenty-four hours for an employee credential issued to an employee by the employer. In this example, if the server system 204 has received information for the employee credential from the employer's system less than twenty-four hours prior to the employee's attempted use of the credential (e.g., presentation of the credential to gain access to the employer's building), the server system 204 may validate the use of the employee credential without having to communicate with the employer's system. If not, the server system 204 communicates with the employer's system to receive updated credential information for the employee credential and validates the use of the employee credential based on the updated credential information for the employee credential.

Credentials also may be associated with an expiration date. When a credential is associated with an expiration date, credential information for the credential may be stored by the server system 204 until the expiration date. For instance, when the server system 204 determines that the expiration date of a credential has passed, the server system 204 may delete the data defining the expired credential and remove the expired credential from the user's account.

The validation server 206 is in communication with the account data store 210 and the credential data store 212, for example, to manage and validate credentials. The validation server 206 authenticates and establishes connectors 214(a)-214(c) with various trusted credential issuing organizations 216(a)-216(c) as shown in FIG. 2. A connector 214 may include communication information that the server system 204 uses to communicate with a credential issuing organization 216. For instance, the communication information may include an electronic address (e.g., a uniform resource locator (URL)) that the server system 204 uses to communicate with the credential issuing organization 216 and a set of guidelines that govern a format for exchanging communications between the credential issuing organization 214 and the server system 204. The credential issuing organization 214 programs its system to follow the set of guidelines stipulated by the server system 204 to enable the two platforms to communicate credential information successfully. The set of guidelines stipulated by the server system 204 may be published to allow software developers and/or information technology staff to configure the systems at the credential issuing organizations 216 to comply with the set guidelines. A connector 214 may be established between the system of a credential issuing organization 216 and the server system 204 when the server system 204 stores the communication information and the system of the credential issuing organization 216 has been configured to communicate in accordance with the set of guidelines. In some implementations, the communication information defining the connector 216 may include communication information that enables the credential issuing organization 214 to communicate with the server system 204 through an Application Program Interface (API) of the server system 204. The server system 204 may store unique communication information for each credential issuing organization 216 and, thus, establish a unique connector 214 with each credential issuing organization 216. For the sake of brevity, the term connector 214 is used throughout this disclosure to refer to communication information used in exchanging communications with a credential issuing organization and does not necessarily connote a physical connection between the server system 204 and a system of the credential issuing organization 216, although a physical connection may be used in some implementations.

As shown in FIG. 2, the validation server 206 has established multiple, different connectors 214 (a)-(c) for multiple, different credential issuing organizations. The credential issuing organizations may include one or more universities, one or more companies, and one or more government agencies. Each credential issuing organization maintains a credential repository (e.g., credential repositories 216 (a)-(c)) on a system operated by the credential issuing organization. The systems operated by the credential issuing organizations use the connectors 214 (a)-(c) to communicate credential information from the credential repositories 216 (a)-(c) to the validation server 206. For instance, the client device 200 may wish to display a credential from the credential issuing organization associated with the connector 214 (a). The validation server 206 first identified the organization as authentic and established the connector 214 (a) between the server system 204 and the credential issuing organization. Using the connector 214 (a), the validation server 206 sends a request to the credential issuing organization for credential information of a user of the client device 200. The credential issuing organization accesses data from the credential repository 216 (a) and uses the connector 214 (a) to provide credential information from the accessed data to the validation server 206, which, in turn, provides credential information to the client device 200 for display through the credential management application. In some implementations, a credential issuing organization may provide several types of credentials to a user such that the user's account includes multiple, different credentials issued by the credential issuing organization to the user. Additionally or alternatively, a user may receive credentials from several different credential issuing organizations such that the user's account includes, at least a first credential issued by a first organization and a second credential issued by a second organization. The credential management system may maintain accounts for many different users, and may manage credentials issued to these users by many different organizations.

Figure 3A:
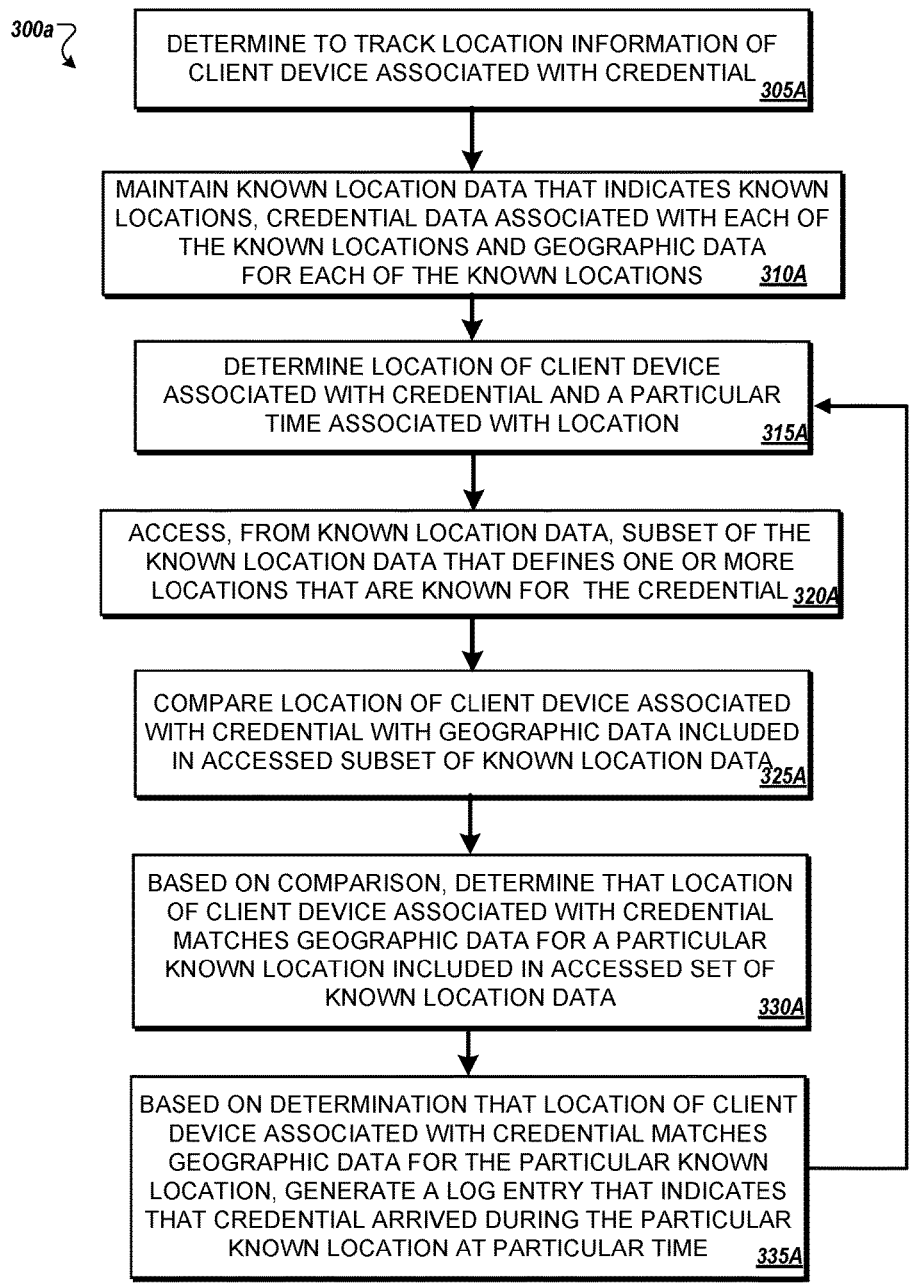
FIG. 3A illustrates an example process for generating an activity log.

FIG. 3A illustrates an example process 300a for generating an activity log. The operations of the process 300a are described generally as being performed by the server 206. The operations of the process 300a may be performed by one of the other components of the system 204 or may be performed by a combination of the components of the system 204. In some implementations, operations of the process 300a may be performed by one or more processors included in one or more electronic devices.

The server 206 determines to track location information of a client device associated with a credential (305a). For example, the server 206 may receive an indication from a client device that the user of the client device has selected a credential that is accessible to the user via the client device as a credential in connection with which the location of the client device is to be tracked. The user may open a credential application on the client device to display the user's credentials. The user then may select the appropriate credential as the credential for tracking the location of the client device. For example, the user may select an employee credential issued by the employee's employer if the user is beginning activity that the employer would like to track.

Alternatively, the server 206 may determine to track the location of the client device without receiving an indication from the client device that the user of the client device has selected a credential for tracking the location of the client device. For example, an employee may begin the workday at 9:00 am and end the workday at 5:00 pm. The employer may instruct the server 206 to log the location of the client device associated with the employee's employee credential during the workday irrespective of whether the employee selected the employee's employee credential as a credential in connection with which the location of the client device is to be tracked.

The server 206 maintains known location data that indicates known locations, credentials associated with each known location, and geographic data for each of the known locations (310a). For example, the server 206 may maintain a database that stores information about different locations. A known location for a particular credential may be a location for which the server 206 stores data that corresponds to the location. The particular credential may be associated with a set of known locations. The set of known locations may be different for different credentials. The data that the system stores in association with a corresponding location may include latitude and longitude coordinates, an address, or other types of data used to identify or otherwise describe a geographic location. Known locations may include particular businesses or entities that occupy the location described by the geographic data. Known locations may include additional information, such as a short hand name for the location. In some implementations, the database may be maintained by the client device. For example, a client device may store data, for credential A, indicating that location 38.8900° N, 77.0300° W corresponds to known location Customer #3, Site #2 and that location 30.2669° N, 97.7428° W corresponds to a customer site of Customer #1.

The server 206 determines a location of the client device associated with the credential and a particular time range associated with the location (315a). For instance, the client device may transpond its location to the server 206 at particular time intervals. In some implementations, the time intervals may be determined by the server 206. For example, the time interval may be every second, every minute, or every five minutes. In some implementations, the client device may transpond its location along with a time stamp. For example, the client device may transpond coordinates 38.8900° N, 77.0300° W and time stamps 11:03 am, 7/15/2012 and 11:18 am, 7/15/2012. The server 206 then records that time stamp and location as received from the client device and computes the time range for that location. The server 206 may also record the time the server 206 receives the location and time stamp. In some implementations, the client device may transpond just its location. For example, the client device may transpond coordinates 30.2669° N, 97.7428° W. The server 206 then records those coordinates and the time associated with the coordinates and a range between transponded locations.

The server 206 accesses location data for a set of known locations associated with the credential from the known location data (320a). In some implementations, a particular subset of known locations may be associated with an individual credential. For example, a particular set of known customer locations corresponding to customer locations that a particular employee is assigned to visit may be associated with the employee's employee credential. This exact same set of known customer locations may not be associated with other employees' employee credentials because the other employees may not be assigned to visit the exact same set of known customer locations. Alternatively, in some implementations, a particular subset of known locations may be associated with multiple credentials. For example, multiple repair employees of an employer may have employee credentials that are associated with the same set of known customer locations because any of the repair employees may travel to any of the known customer locations.

The server 206 compares the geographic location of the client device associated with the credential with geographic location data included in the accessed set of the known location data (325a). For example, the server 206 compares the location of the client device that the server 206 received above, 38.8900° N, 77.0300° W, with the set of known locations stored in the database. The database may indicate that 38.8900° N, 77.0300° W corresponds to Customer #3, Site #2. The server 206 then determines that the location of the client device associated with the credential matches geographic data for a particular known location included in the accessed set of the known location data (330a). Therefore, the client device, and likely the employee was at Customer #3, Site #2 at 11:03 am on 7/15/2012.

In some implementations, the comparison of the location of the client device with known location data occurs on the client device. For example, the client device determines that its location was 38.8900° N, 77.0300° W at 11:03 am, 7/15/2012. If the known location data is stored on the client device, then the client device may determine that 38.8900° N, 77.0300° W corresponds to Customer #3, Site #2.

In some implementations, the system may have a particular tolerance built in. Such a tolerance allows client devices that are located within a particular threshold of a known location to be associated with that known location even if the transponded location and the known location in the known location data do not match up exactly. For example, the threshold may be one mile. The client device may transpond that the location of the client device is 37.89370° N, 79.0730° W. The system may include known location data that associates 37.89375° N, 79.0740° W with Customer #5. Even though the client device is not at exactly the location associated with Customer #5, the server 206 may determine that the location of the client device is within one mile of the location associated with Customer #5. The location of the client device would not be unknown. Where the known location data is maintained on the client device, the client device may perform similar threshold calculations.

As a client device is transponding location data to the server 206, the client device may transmit geographic data that does not correspond to a known location in the known location database. The server 206 may transmit data to the client device warning the employee that the employee is located at an unknown location. The client device may give the employee the option to identify the unknown location and the server 206 would add any data inputted by the employee. Alternatively, the server 206 may prompt the employer to identify the unknown location, and then the server 206 would add any data inputted by the employer to identify the unknown location.

The server 206 generates a log entry that indicates presence of the credential at the particular known location during the particular time range (335a). Once the server 206 compares the location of the client device with known location data over a time period, the server 206 may generate a log describing the location of the client device. For example, if the server 206 determines that the client device was at Customer #3, Site #2 at 11:00 am, 11:05 am, 11:10 am, 11:15 am, and 11:20 am all on 7/15/2012, then the server 206 may generate a log entry indicating that the employee corresponding to the client device was at Customer #3, Site #2 from 11:00 am to 11:20 am on 7/15/2012.

The server 206 continues to determine the location of the client device based on the client device transponding the location to the server 206. The server 206 may determine that the client device remained at the same location as the previously transponded location and may update the log entry. For example, the server 206 may determine that the client device remained at Customer #3, Site #2 at 11:25 am. The server 206 may then update the log entry to Customer #3, Site #2 from 11:00 am to 11:25 am on 7/15/2012. The server 206 may determine that the client device left the location previously transponded by the client device. For example, the server 206 may determine that the client device left Customer #3, Site #2 because the client device transponded from Customer #3, Site #1 at 11:25 am. The server 206 may then mark the log entry Customer #3, Site #2 from 11:00 am to 11:20 am on 7/15/2012 as concluded. The server 206 may then begin a new log entry Customer #3, Site #1 from 11:25 am to TBD on 7/15/2012, where the TBD indicates a time to be determined when the client device stops transponding from Customer #3, Site #1.

In some implementations, the client device may generate the log entry. For example, where the known location data is maintained on the client device, the client device uses that data indicating that the client device was at Customer #3, Site #2 at 11:00 am, 11:05 am, 11:10 am, 11:15 am, and 11:20 am all on 7/15/2012. The client device may generate a log indicating that the employee corresponding to the client device was at Customer #3, Site #2 from 11:00 am to 11:20 am on 7/15/2012.

Figure 3B:
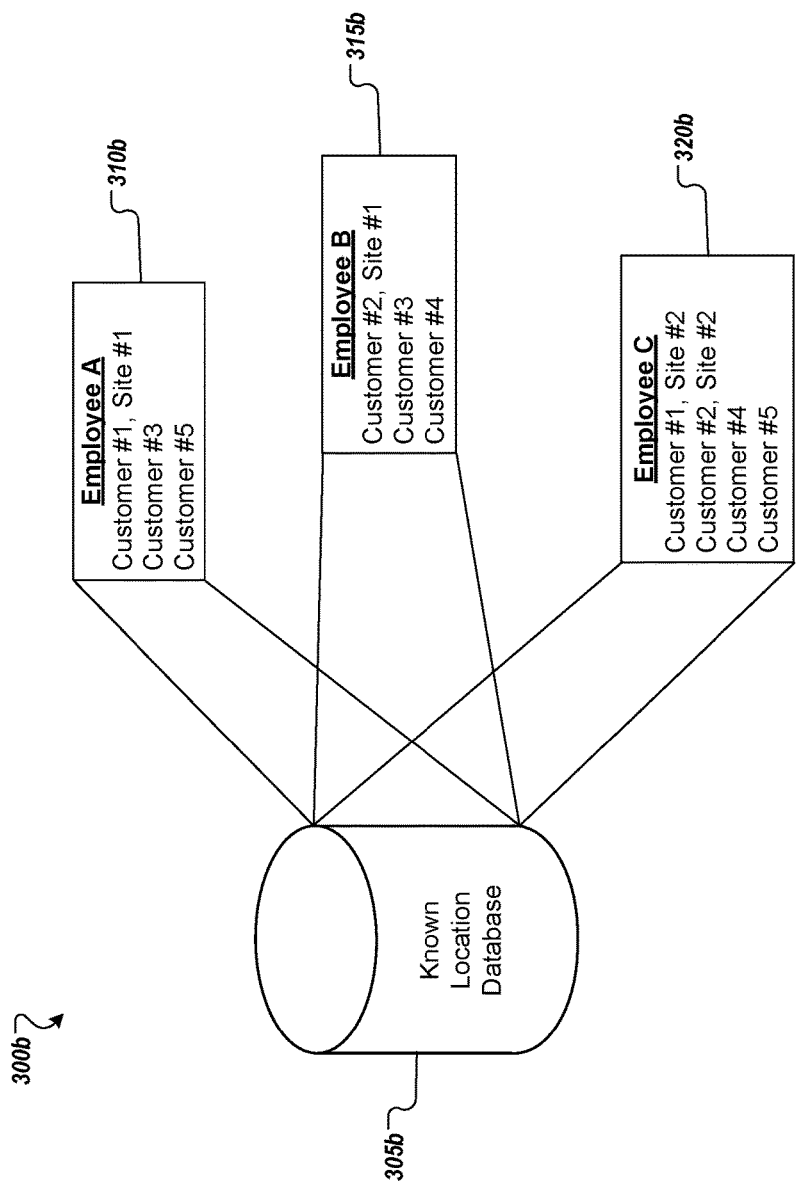
FIG. 3B illustrates an example known location database.

FIG. 3B illustrates an example known location database 305b. The known location database 305b stores the known locations and data associated with each known location and may be incorporated within the account data store 210. Each known location is associated with one or more credentials. Known location database 305b stores known location data for three credentials for Employees A, B, and C. The known locations 310b for Employee A are Customer #1, Site #1; Customer #3; and Customer #5. The known locations 315b for Employee B are Customer #2, Site #1; Customer #3; and Customer #4. The known locations 320b for Employee C are Customer #1, Site #2; Customer #2, Site #2; Customer #4; and Customer #5. As is illustrated by the known location database 305b, a particular known location may be associated with more than one credential.

The server 206 uses the known location database 305b to compare a geographic location received from a client device to the known locations in the database for the credential associated with the client device. For example, if Employee A selected his credential for transponding, and Employee A's device transponded the location associated with Customer #3, then, after accessing the known location database 305b, the server 206 would be able to determine that the location of Customer #3 was a known location for Employee A. If Employee A's device transponded the location associated with Customer #1, Site #2, then, after accessing the known location database 305b, the server 206 would be able to determine that the location of Customer #1, Site #2 was not a known location for Employee A.

FIGS. 4-9 illustrate example user interfaces for an application.

Figure 4:
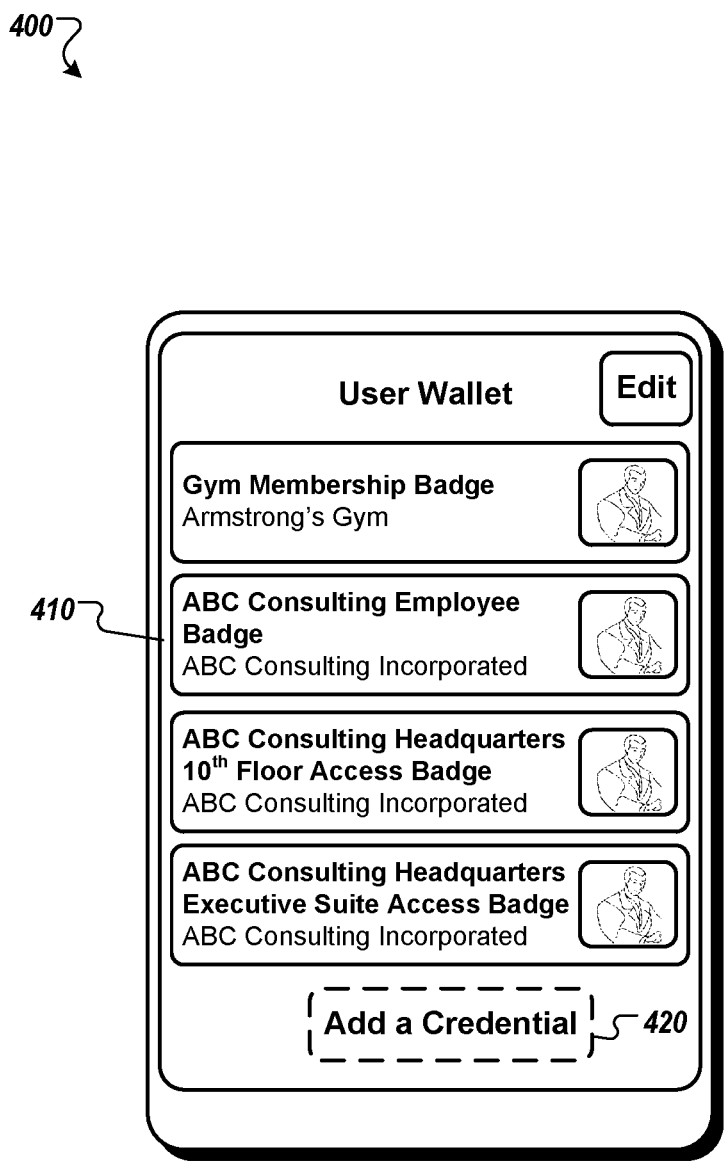
FIGS. 4-9, 14, and 15 are diagrams illustrating example user interfaces.

For example, FIG. 4 illustrates an example user interface 400 rendered on a computing device that enables a particular user to access credentials that have been issued to the particular user by one or more credential granting authorities. In this example, the user interface 400 shows, on a mobile device, a user's wallet that provides the user with access to numerous different credentials of the user. The user may select any one of the user's credentials from the user's wallet in order to access that credential on the user's mobile device. For instance, when the user selects the credential 410, the user's mobile device makes the credential 410 accessible as illustrated in FIG. 5.

Figure 5:
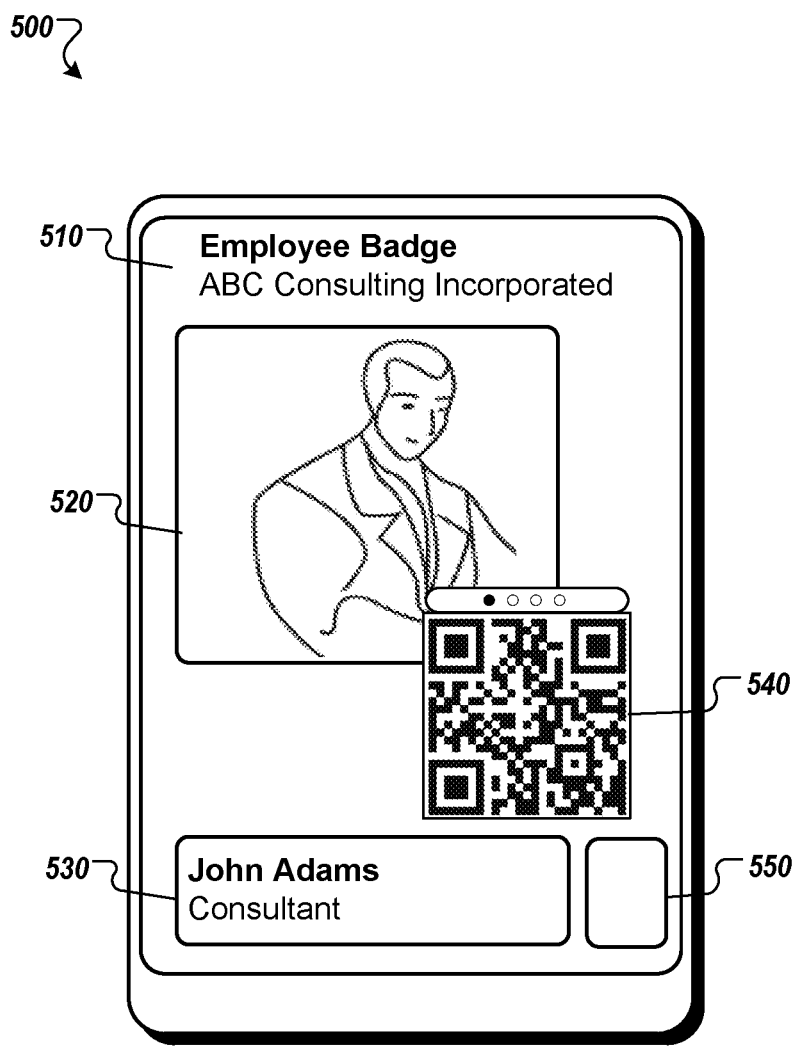

FIG. 5 illustrates an example user interface 500 that displays the selected credential 410. The user interface 500 includes a description 510 of the selected credential and a picture 520 of the user who holds the credential. Also, the user interface 500 includes personal information 530 of the user that holds the credential and an identifier 540 that identifies the credential held by the user and that may enable validation of the credential by other users. As shown, the identifier 540 may be a quick response (QR) code. The user interface 500 further includes a button 550 that causes additional information about the credential to be displayed. For instance, when the user selects the button 550, the user's mobile device displays the interface 600 illustrated in FIG. 6.

Figure 6:
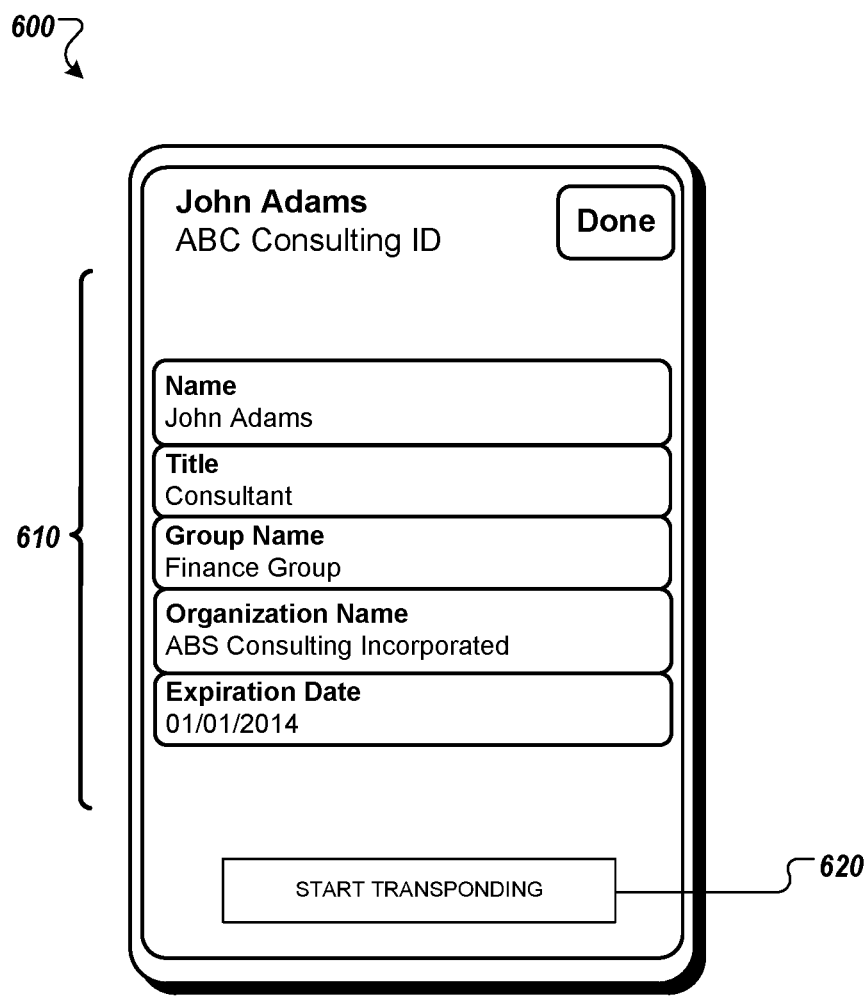

FIG. 6 illustrates an example user interface 600 that displays additional information 610 about the credential. The additional information 610 includes the credential holder's name (John Adams), the credential holder's title (Consultant), a group to which the credential holder belongs (Finance Group), the name of the organization that issued the credential (ABC Consulting), and an expiration date for the credential (Jan. 1, 2014). The user interface 610 also includes a button 620 that enables a user to instruct the credential to start transponding the location of the client device from which the credential is being accessed. In some implementations, transponding the location of the client device involves transponding the current location of the client device to a server. Additionally or alternatively, transponding the location of the client device may involve tracking the location of the client device at the client device. Responsive to user selection of the button 620, the user's mobile device may display the interface illustrated in FIG. 7.

Figure 7:
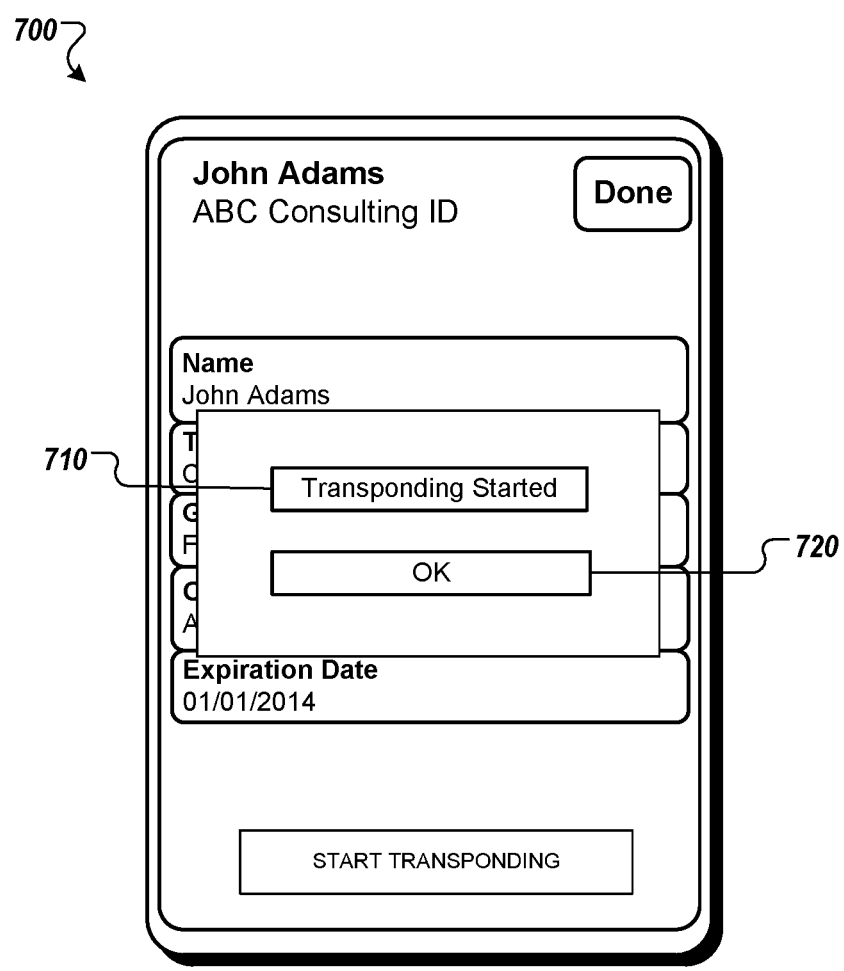

FIG. 7 illustrates an example user interface 700 that displays a message 710 that notifies the user that the credential has started transponding the location of the client device. The user interface 700 also includes a button 720 that enables the user to clear the notification 710 that the credential has started transponding the location of the client device.

Using techniques described above in connection with FIGS. 4-7, the user may activate as many (or as few) of the user's credentials (e.g., the credentials illustrated in FIG. 4) to transpond as the user desires. As such, at any point in time, the user's client device may be transponding none, one, or any number of multiple different credentials. Each credential may transpond location information to a different server and/or each credential may be associated with a different set of known locations.

Figure 8:
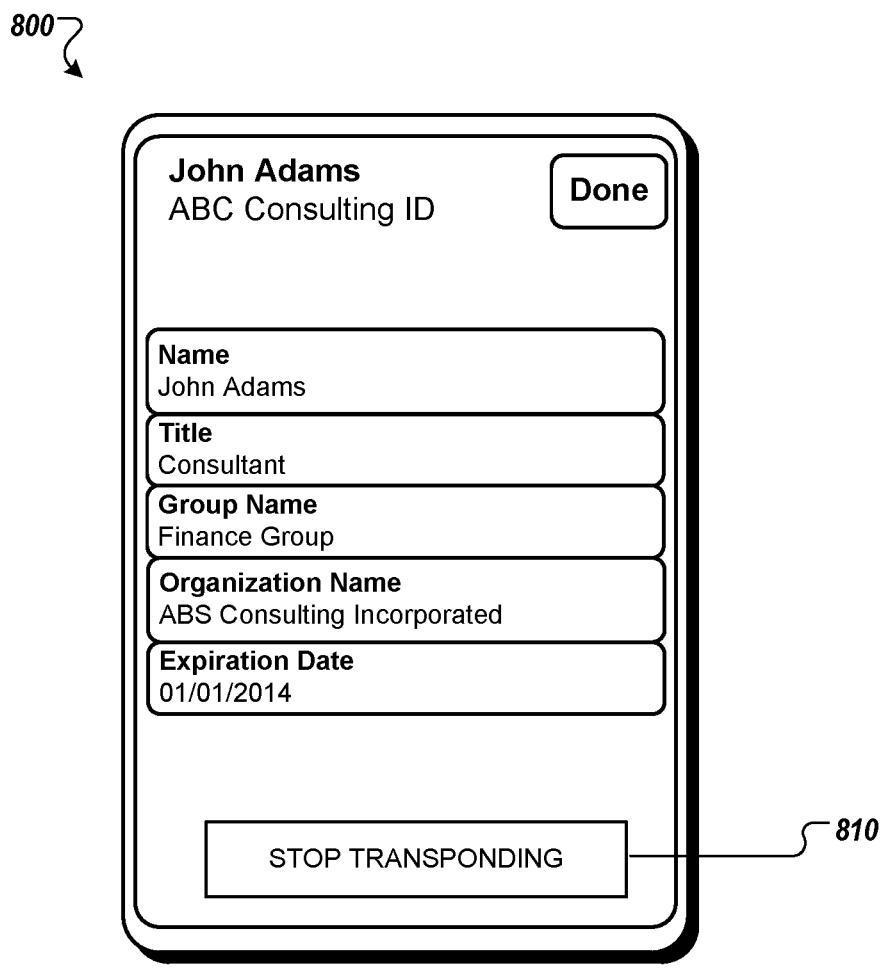

FIG. 8 illustrates an example user interface 800 that displays a button 810 that enables a user to stop the credential from transponding the location of the client device from which the credential is being accessed. When the user desires to stop the transponding of the location of the client device, the user may select the button 810 to turn off the transponding of the location of the client device. The user interface 800 is essentially the same as the user interface 600 illustrated in FIG. 6, except that the button 810 enables the user to stop (instead of start) the transponding of the location of the client device. Responsive to user selection of the button 810, the user's mobile device may display the interface illustrated in FIG. 9.

Figure 9:
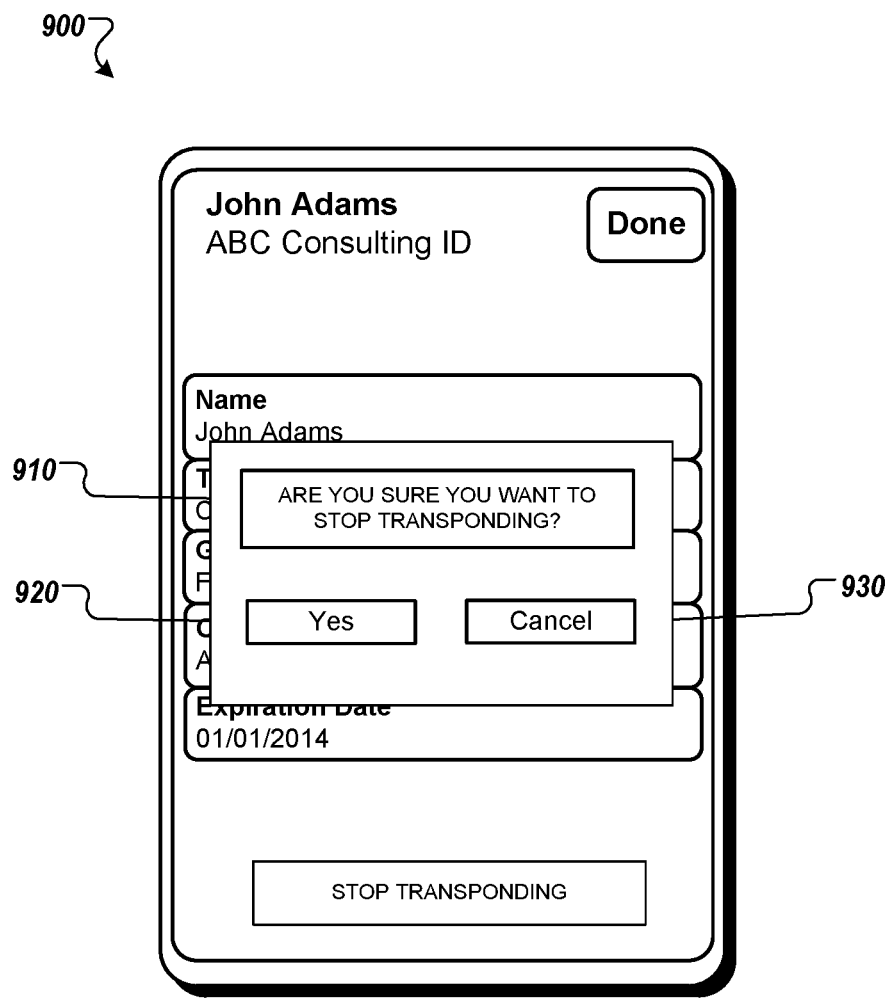

FIG. 9 illustrates an example user interface 900 that displays a message 910 that asks the user to confirm that the credential should stop transponding. The user interface 900 also includes a button 920 that enables the user to confirm that the credential should stop transponding and a button 930 that enables the user to cancel the request for the credential to stop transponding. Selection of the button 920 causes the credential to stop transponding, while selection of the button 930 causes the credential to continue transponding.

FIG. 10 illustrates an example set of known location data 1000. Similar to FIG. 3B, FIG. 10 illustrates credentials and their corresponding known locations. Each credential is associated with a group of known locations (e.g., locations where the corresponding user of the credential frequently travels). The set of known location data 1000 may be stored by either the server 206 or by a client device. The set of known location data 1000, or database of known locations, includes a location name and the associated geographic coordinates and associated credentials for each known location. The location name column 1005 for a particular known location may include a name (or other descriptive identifier) for the known location. For example, the location name column 1005 for a particular known location may identify a business or other entity located at the known location. The geographic coordinates column 1010 for a particular known location may include geographic coordinates associated with the known location. Furthermore, the associated credentials column 1015 may include data that identifies the credentials that are associated with the known location. A location is a known location if it is associated with a credential. In some implementations, a location may be associated with a credential based on input provided by a credential granting authority that grants the credential. For instance, an employer that grants employee badges may provide input to define a location of the employer's office as well as locations of customer sites of the employer as the known locations associated with badges granted by the employer. In the example shown in FIG. 11, an unknown location may be +32.179981, −131.369834 because, although the system is aware of the coordinates of the location, the geographic coordinates do not appear as a known location for any of the credentials listed in the associated credentials column 1015.

In some examples, whether a location is known or unknown may vary depending on which credential is being tracked. For instance, a first location may be known for a first credential, but unknown for a second credential, a second location may be known for the second credential, but unknown for the first credential, and a third location may be known for both the first credential and the second credential. This scenario may arise when the first credential is granted by a first employer that is in the same field as a second employer that grants the second credential. In this scenario, the first location may correspond to a customer of only the first employer, the second location may correspond to a customer of only the second employer, and the third location may correspond to a shared customer of the first employer and the second employer.

In some implementations, the location name column 1005 for a geographic coordinate includes the name of a business located at the corresponding geographic coordinate. For example, the location name may be Customer #1 or Supplier #1. In some implementations, the location name column 1005 may include additional information to differentiate between known locations that are associated with the same business. For example, the location name column 1005 for record 1025 identifies the location name for the known location as Customer #2, Site #1 and the location name column 1005 for record 1030 identifies the location name for the known location as Customer #2, Site #2 because Customer #2 has multiple different locations.

In some implementations, the geographic coordinates column 1010 for a particular known location includes latitude and longitude coordinates for the particular known location. For example, the coordinate column 1010 may have an entry defined as 38.8900° N, 77.0300° W. Depending on the implementation, the coordinates may be formatted in various ways including using N/S/E/W labels, +/−labels, decimal numbers, or degrees/minutes/seconds. Additionally or alternatively, in some implementations, the geographic coordinates column 1010 for a particular known location may include an address for the particular column. For example, the coordinate column 1010 may have an entry defined as 123 Elm St, Washington, D.C. 20001.

In some implementations, the associated credentials column 1015 for a known location includes a list of credentials associated with the corresponding known location. For example, the associated credentials column 1015 may have an entry that lists the credentials for Employees A, B, C, M, Q, and R as credentials associated with the corresponding known location. In some implementations, the associated credentials column 1015 for a known location may identify a group of credentials as being associated with the corresponding known location. For example, the associated credentials column 1015 for a known location may identify credentials for employees belonging to the Repair Group as credentials associated with the corresponding known location. As shown, record 1030 illustrates that a known location for the Repair Group is Customer #2, Site #2. Accordingly, the known location of Customer #2, Site #2 is compared against locations determined for all credentials that are associated with the Repair Group. In some implementations, the associated credentials column 1015 for a known location includes an indication that a location is known for all credentials. Furthermore, the set of known location data 1000 may contain known locations for more than one credential granting authority. For example, the set of known location data 1000 may contain known locations for credentials issued by ABC Consulting and known locations from credentials issued by XYZ Repair Services.

Figure 11:
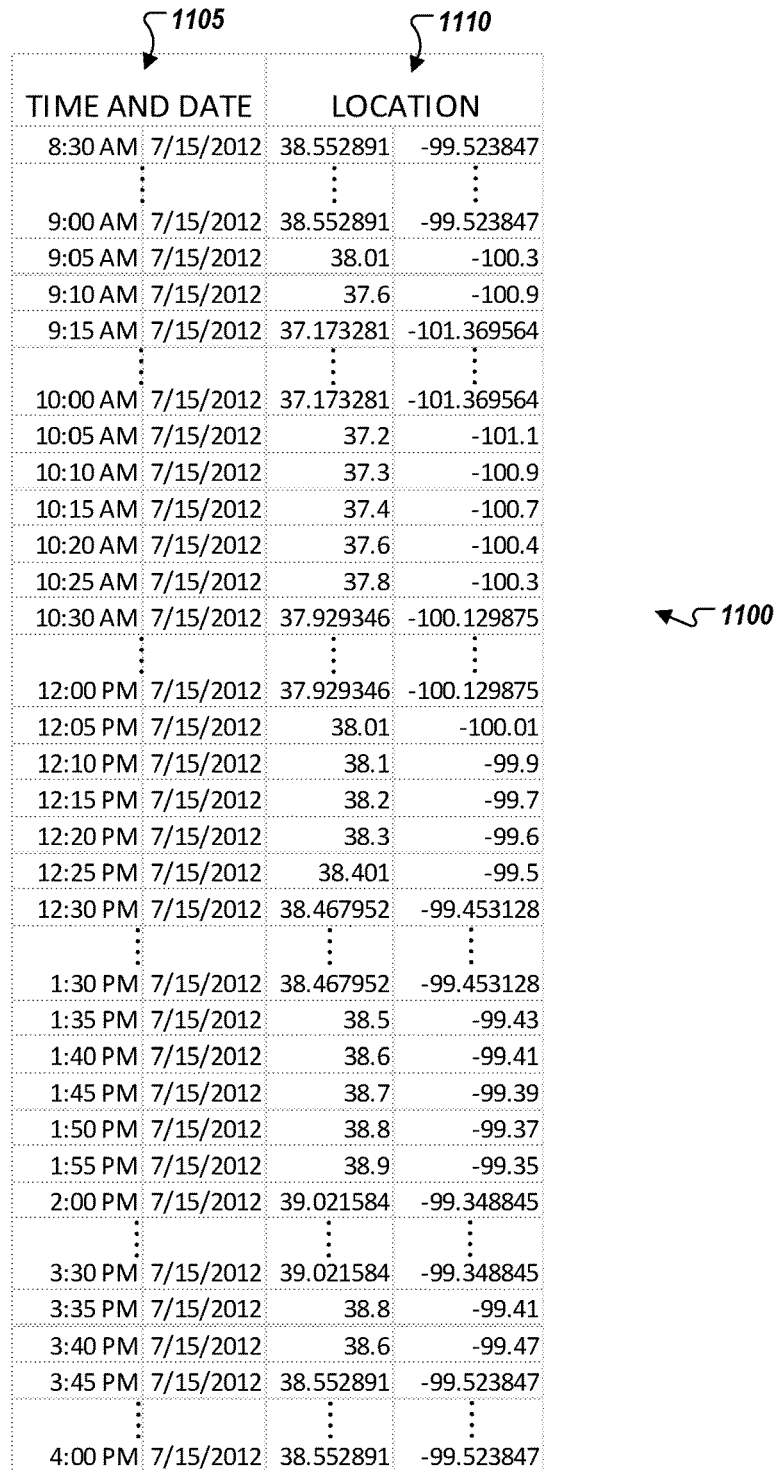
FIG. 11 illustrates an example log 1100 that tracks locations transponded by a credential.

FIG. 11 illustrates a log 1100 that tracks locations transponded by a credential. The log 1100 may be used to store the information received by the server 206 from the client device. The information includes a time and date stamp and geographic coordinates of the location of the credential at the stamped time and date. The log 1100 lists the time and date stamp and geographic coordinates as received at five minute intervals.

Log 1100 includes two columns: a time column 1105 and a location column 1110. The location column 1110 stores indications of locations from which the client device transponded its location in connection with the credential. In some implementations, the indications of the locations recorded in the location column 1110 may be recorded as latitude and longitude coordinates. In such implementations, the coordinates may be formatted in various ways including using N/S/E/W labels, +/−labels, decimal numbers, or degrees/minutes/seconds. Additionally or alternatively, in some implementations, the indications of the locations recorded in the location column 1110 may be recorded as addresses. Time column 1105, meanwhile, stores indications of the times at which the client device transponded its location indicated in the location column 1110. The indications of the times recorded in the time column 1105 may reflect the times at which the corresponding location information indicated in the location column 1110 was received. Alternatively, the indications of the times recorded in the time column 1105 may reflect the times at which the client device transponded the corresponding location information indicated in the location column 1110. As illustrated in FIG. 11, in some implementations, the client device may transpond location information with a particular frequency. For example, the client device may transpond location information every five minutes, every minute, every ten seconds, etc. In some other implementations, the client device may transpond location information only in response to detecting that its location has changed significantly.

Log 1100 records indications of the locations from which the client device transponded its location in connection with the credential from 8:30 am on 7/15/2012 to 4:00 pm on 7/15/2012. As illustrated in FIG. 11, log 1100 indicates that, from 8:30 am to 9:00 am, the client device remained at the same location (not all times shown). Between 9:00 and 9:15 am, the client device moved between the geographic location listed at 9:00 am and the geographic location listed at 9:15 am. Log 1100 also indicates that, from 9:15 am to 10:00 am, the client device remained at the same location (not all times shown). The log 1100 recorded the location of the client device while the credential was transponding from the client device. The log 1100 records the location of the client device from 9:00 am until 4:00 pm.

Figure 12:
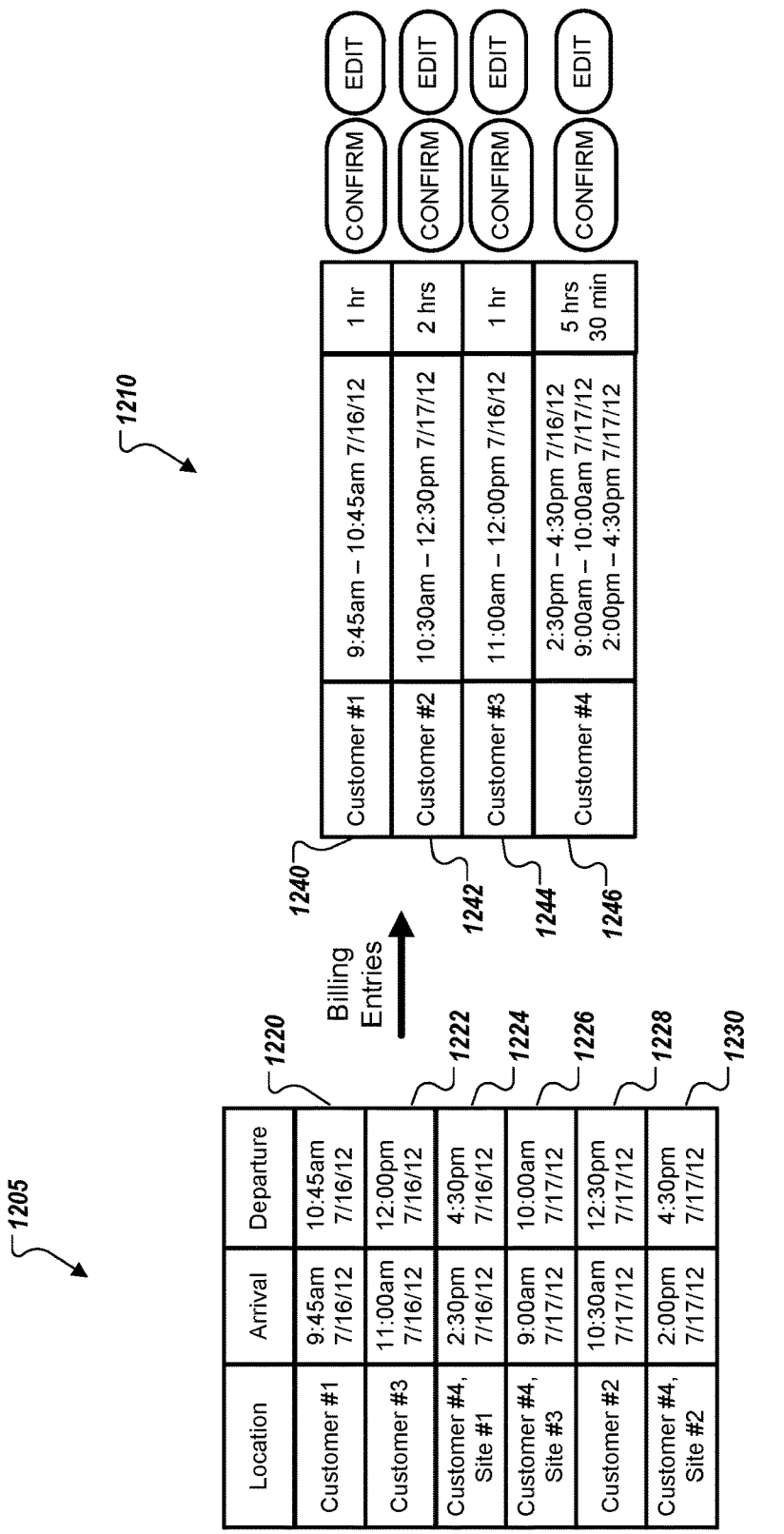
FIG. 12 illustrates an example of an automatically generated time card and associated billing entries.

FIG. 12 illustrates an example of an automatically generated time card 1205 and associated billing entries 1210. Time card 1205 or billing entries 1210 or both may be generated by either the server 206 or by the client device. As illustrated in FIG. 12, the time card 1205 records the locations of a client device associated with a credential that has been activated for transponding over a two day period. Corresponding billing entries 1210 have been automatically generated based on the tracked locations of the client device over the two day period. The tracked locations of the client device may correspond to the locations of an employee who holds an employee credential issued by the employee's employer that the employee has activated for transponding from the employee's client device as the employee travels throughout the employee's work day. The employee's employer may use the billing entries 1210 to generate invoices for the employer's customers.

As shown in log entry 1220, the client device transponded the location associated with Customer #1 from 9:45 am to 10:45 am. In some implementations, the client device may have accessed a set of known locations on the client device to determine that the location of log entry 1220 was associated with Customer #1. For example, the client device may have determined its location to be 32.8900° N, 72.0300° W.

The client device may have accessed a set of known locations on the client device that identified 32.8900° N, 72.0300° Was being associated with the location of Customer #1. The client device may then transpond Customer #1 as its location instead of 32.8900° N, 72.0300° W. In some implementations, the server 206 may have received the geographic coordinates 32.8900° N, 72.0300° Was the transponded location information for the client device and determined that the location is associated with Customer #1. For example, responsive to receiving the geographic coordinates 32.8900° N, 72.0300° W from the client device, the server 206 may have accessed a database accessible to the server 206 to determine that 32.8900° N, 72.0300° W is associated with the location of Customer #1.

At 10:45 am on Jul. 16, 2012, the client device last transponded its location from Customer #1. The time period between 10:45 am and 11:30 am is not associated with a log entry. In some implementations, the client device or server 206 may not generate log entries for locations where the client device is for less than a threshold period of time. For example, the client device or server 206 may not generate a log entry for a location at which the client device is located for less than ten minutes. Additionally or alternatively, in some implementations, the client device or server 206 may not generate a log entry for a location from which the client device transponds for less than a threshold number of periods.

Log entries 1222, 1224, 1226, 1228, and 1230 further record the locations of the client device associated with the transponding credential over the two day period. Log entries 1220, 1222, and 1224 record locations of the client device on Jul. 16, 2012 between 9:45 am and 4:30 pm while the credential was transponding. Log entries 1226, 1228, and 1230 record locations of the client device on Jul. 17, 2012 between 9:00 am and 2:30 pm while the client device was transponding. Intervening time periods that do not appear as entries in time card 1205 may correspond to periods of time when the credential was not transponding. For example, at 12:30 pm on Jul. 16, 2012, the employee may have deactivated the credential for transponding on the client device and, then, at 2:00 pm on Jul. 16, 2012 the employee may have reactivated the credential for transponding from the client device. Alternatively, between 12:30 pm and 2:00 pm on Jul. 16, 2012, the credential may have been activated for transponding, but the client device may not have been at the same location for longer than a threshold period of time or the client device only may have been located at locations not known to be associated with the transponding credential.

The server 206 generates billing entries 1210 based on the time card 1205. In some implementations, the server 206 identifies log entries that correspond to the same customer and groups those log entries together for a particular billing entry. For example, the server 206 identifies log entries 1224, 1226, and 1230 as corresponding to Customer #4 and consolidates these log entries into a single billing entry 1246. Billing entry 1246 lists the time periods where the employee was at one of Customer #4's sites and the total time the employee was at Customer #4's sites. Similarly, billing entries 1240, 1242, and 1244 record the time periods where the employee was at a particular Customer's site and the total time that employee was at the Customer's site.

The billing entries 1210 may be displayed to an employer for analysis before generating invoices to bill the customers. Each of the billing entries 1240, 1242, 1244, and 1246 may include a confirm option and an edit option. The confirm option allows the employer to confirm the billing entry and use the confirmed billing entry for inclusion in a customer invoice. The edit option allows the employer to edit the billing entry.

Figure 13:
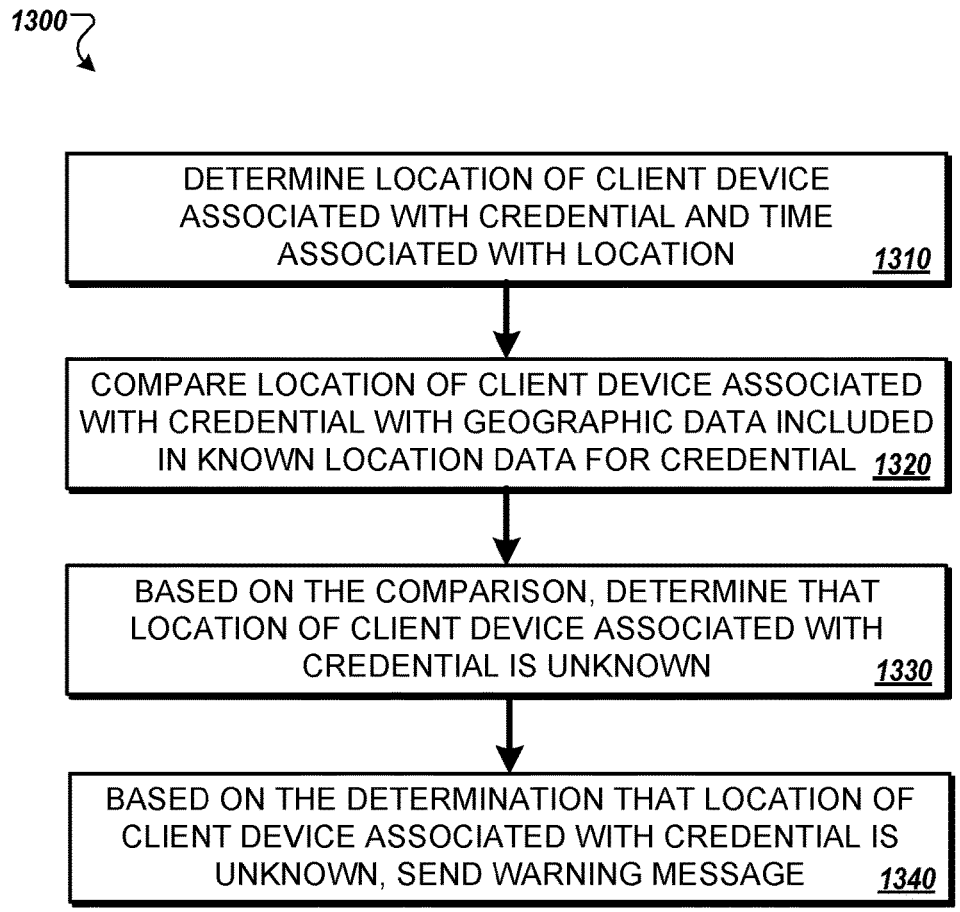
FIG. 13 illustrates an example process where a client device associated with a credential is at an unknown location.

FIG. 13 illustrates an example process 1300 for generating a warning message when a client device associated with a credential that is activated for transponding is at a location not associated with the transponding credential. The operations of the process 1300 are described generally as being performed by the server 206. The operations of the process 1300 may be performed by one of the components of the server 206 (e.g., the server 206) or may be performed by a combination of the components of the server 206. In some implementations, operations of the process 1300 may be performed by one or more processors included in one or more electronic devices.

The server 206 determines a location of a client device associated with an activated credential and a time associated with the location (1310). When a user accesses a credential management application from a client device, the user may select a particular credential in connection with which to begin transponding the location of the client device to the server 206 (e.g., at periodic intervals). The server 206 receives from the client device the client device's location (e.g., at periodic) intervals. The client device may use triangulation techniques or global positioning system (GPS) capabilities to determine the client device's location. Each time the client device determines its location, the client device may transpond its determined location and the current time to the server 206.

The server 206 compares the location of the client device with geographic data included in known location data for the credential (1320). The known location data for the credential lists particular geographic locations and a location name for that particular geographic location. As noted above, the known location data for the credential may be maintained on the client device or by server 206. Where the known location data is maintained on the client device, the client device may compare the current location with the known location data for the credential. Where the known location data is maintained on the server 206, the server 206 may compare the transponded location with the known location data for the credential.

Based on the comparison, the server 206 determines that the location of the client device associated with the credential is unknown (1330). When the server 206 determines that the location transponded from the client device is unknown, the system makes the determination because the location of the client device is not in the known location data for the credential. For example, the known location data for credential A may include two entries: 32.8900° N, 72.0300° W is associated with Customer #1 and 37.89370° N, 79.0730° W is associated with Customer #2. If the transponded location is 31.9820° N, 69.0221° W, then the server 206 may determine that the location of the client device is unknown because the location was not listed in the known location data for credential A. Where the known location data for the credential is maintained on the client device, the client device compares the location of the client device with the known location data for the credential and may determine that the location is unknown.

Based on the determination that the location of the client device associated with the credential is unknown, the server 206 sends a warning message (1340) to the client device, one or more different devices, or both the client device and one or more different devices. One such different device may be a device of a supervising employee. To confirm the identity of a device of a supervising employee, the server

206 may determine that the client device and the device of the supervising employee both store a credential issued by the same employer. For example, the transponding client device may belong to John Adams of ABC Consulting. The server 206 may contain a database that identifies Jim Smith as the supervisor of John Adams. The database may identify a device that holds Jim Smith's ABC Consulting credential. The server 206 then would determine that the device that holds Jim Smith's ABC Consulting credential should receive the warning messages associated with John Adams's credential.

The warning message may provide the option of adding the unknown location to the known location data of the credential by associating the unknown location with a particular location. For example, the warning message may display, on a supervisor's device, that an employee is at +32.165781, −131.366594. The warning message may also display that these coordinates are not a known location for the employee. The supervisor may add the location +32.165781, −131.366594 as a known location for the employee's credential. Where the warning message is sent to a different client device, the warning message may also provide the option of contacting the client device that is at the unknown location. The contact options may include calling the employee, e-mailing the employee, sending a SMS message to the employee or other similar communication technique.

Figure 14:
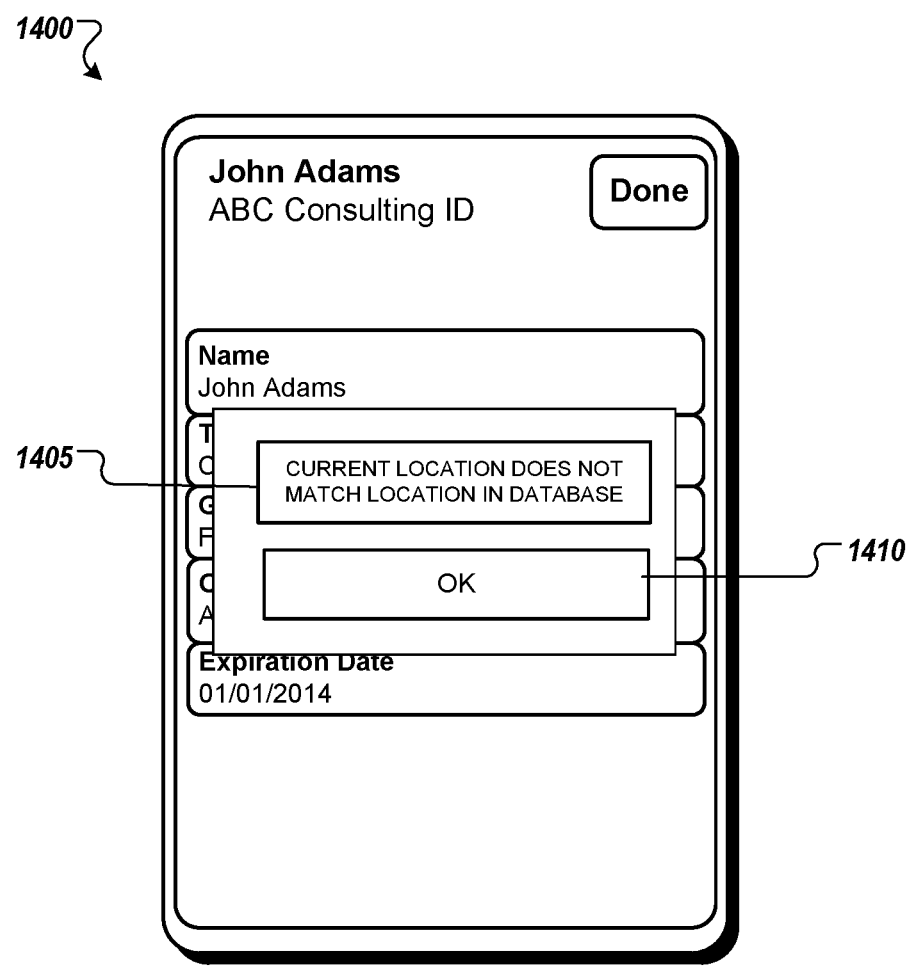

FIG. 14 illustrates a user interface with a warning message 1405 that appears on the client 200 that is located at an unknown location. The warning message 1405 may be sent by the server 206 when the server 206 determines that the client 200 is at an unknown location. Alternatively, the warning message may be generated by the client 200 when the client 200 determines that the client 200 is at an unknown location.

In some implementations and as shown in FIG. 14, the message 1405 may be strictly informative. For example, the message 1405 simply may notify the user of the client 200 that the client device is not at a known location. To dismiss the message 1405, the user may select the button 1410. Alternatively, in some implementations, the message 1405 may include an option to add the unknown location to the known location data. For example, client device may be located at +32.165781, −131.366594 and this location is not a known location for the transponding credential. The message 1405 may allow the user to add +32.165781, −131.366594 to the known locations for the credential. The user may also add a location name for +32.165781, −131.366594 such as Customer #3. The location name and the geographic coordinates are sent to server 206 to add the location name and the geographic coordinates to the known locations for the credential.

Figure 15:
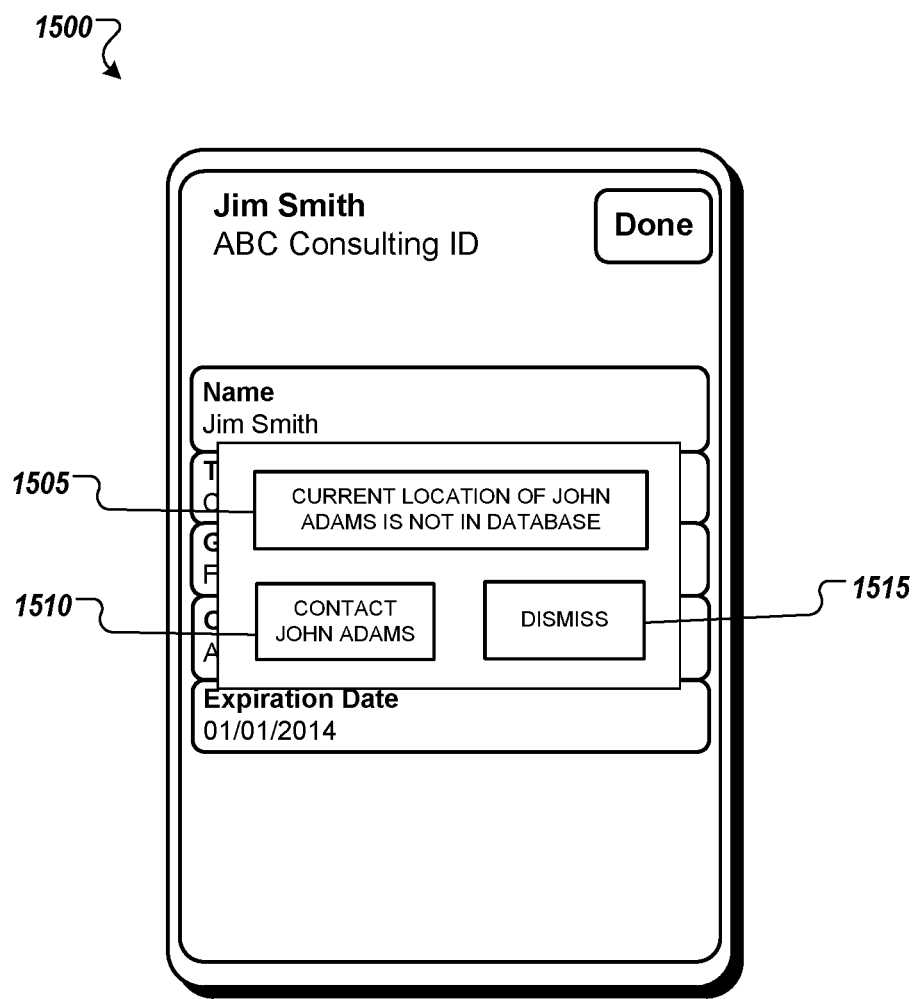

FIG. 15 illustrates a user interface with a warning message 1505 that is sent to the device 1500 of a supervisor of the employee associated with the client 200 at the unknown location. The warning message 1505 may be sent by the server 206 when the server 206 determines that the client 200 is located at an unknown location.

In some implementations and as shown in FIG. 15, the message 1505 may provide the option of contacting the user associated with the client 200. For example, John Adams may be associated with the client 200 that is at an unknown location. The server 206 may determine that the client 200 is at an unknown location and send message 1505 to the client device 1500 indicating that John Adams is at an unknown location. The message 1505 may provide the option of contacting John Adams with button 1510. Contact may be made by telephone, e-mail, SMS message, or other similar technique. Contacting John Adams may help provide the supervisor with insight into whether to add the current location of John Adams to the set of known locations for John Adam's credential and/or to determine whether John Adams should be reprimanded for being at an unknown location during work hours. The message 1505 may also provide the option of dismissing the message 1505 and not contacting John Adams with button 1515.

Figure 16:
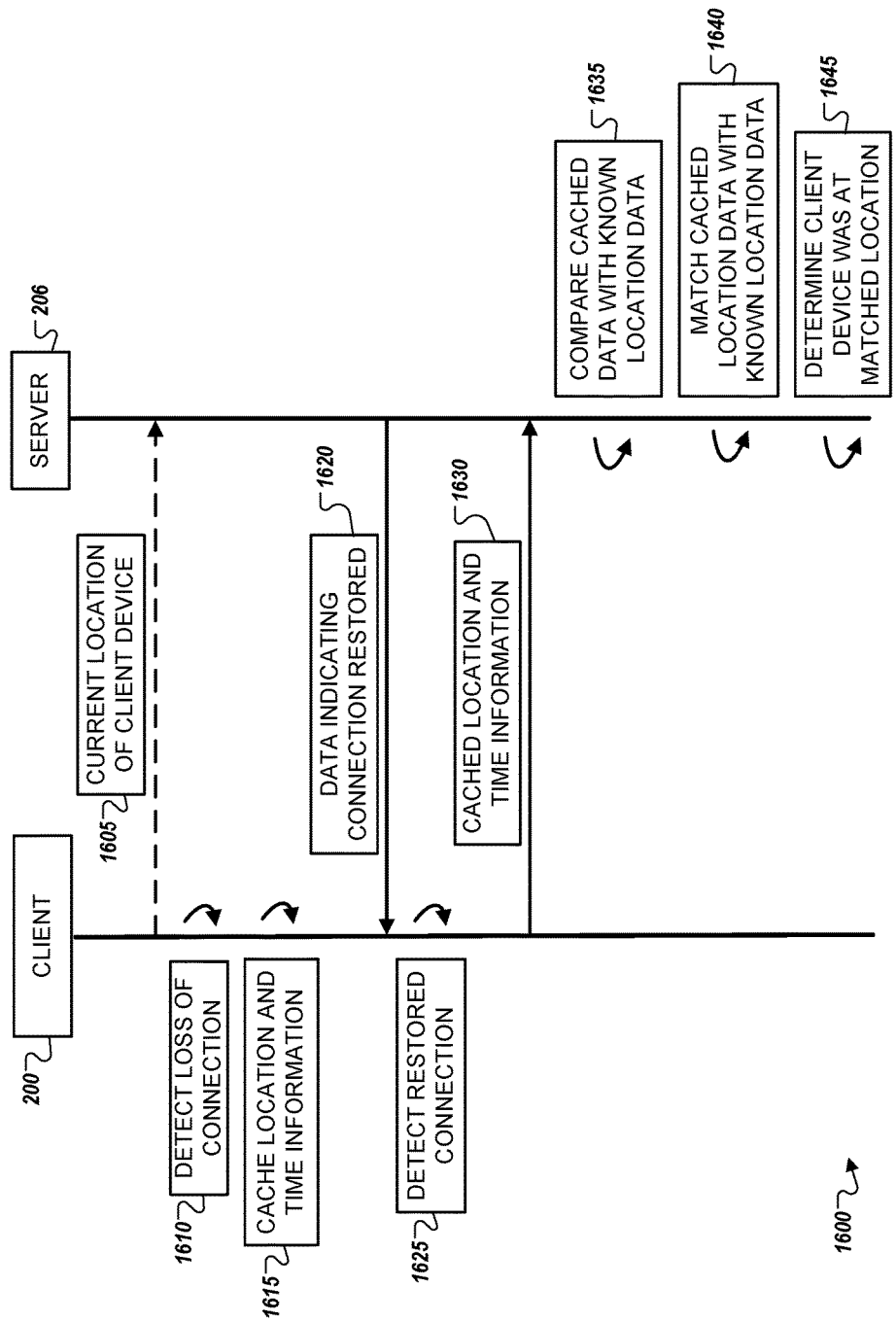
FIG. 16 shows a diagram illustrating operations performed when a client device loses connectivity with the server.

FIG. 16 illustrates a process 1600 for caching location data to be transponded in connection with a credential at a client device when the client device loses connectivity with the server 206. The operations of the process 1600 are described generally as being performed by the server 206 and client 200. In some implementations, operations of the process 1600 may be performed by one or more processors included in one or more electronic devices.

The client 200 is associated with a credential activated for transponding and attempts to send the client device's current location to the server 200 (1605). For various reasons that may include the client device being outside of a wireless service area, the server going offline, or the data connection between the client device and the server being of low quality, the client device detects a loss of connection with the server (1610). In some implementations, the server may confirm each time the server receives location data from the client device. In such implementations, the client device may detect a loss of connection with the server if the client device does not receive confirmation data after having transponded location data.

As a consequence of having detected the loss of the connection with the server, the client device caches the location and time information (1615). Thereafter, the client device continues to detect the client device's location at periodic intervals and, while the connection with the server remains unavailable, the client device caches the location and time information at the client device for later sending to the server.

The client device detects that the server connection is restored (1620). As a consequence of detecting that the connection with the server has been restored, the client device sends the cached location and time information stored at the client device to the server (1630). In some implementations, once the client device sends the cached data to the server, then the client device deletes the cached data stored on the client device.

The server receives the cached location and time information from the client device and processes it in a similar fashion to current location and time information received from the client device. The server compares each cached location of the client device with geographic data included in the set of known location data (1635). Each cached location may correspond to a different location of the client device as would be the case if the client device was moving when the client device was not connected to the server. Based on the comparison of each cached location with geographic data, the server matches each cached location with corresponding geographic data included in the set of known location data (1640) and determines that the client device was located at one or more matched locations during the loss of connection with the server (1645). As a result, the cached location and time information may be integrated with other location and time data transponded by the client device while the client device was connected to the server to generate an activity log.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. A computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   determining to track location information of a client device associated with a credential, the credential having been granted to a user of the client device by a credential granting authority to indicate a status of the user with the credential granting authority;
   maintaining known location data that indicates (i) geographic locations and (ii) credential data that indicates one or more credentials that are associated with each of the geographic locations;
   determining a current geographic location of the client device associated with the credential;
   comparing the current geographic location of the client device associated with the credential with the known location data;
   based on comparing the current geographic location of the client device associated with the credential with the known location data, determining that the current geographic location of the client device associated with the credential matches a particular geographic location included in the known location data;
   accessing, from the known location data, particular credential data that indicates one or more credentials that are associated with the particular geographic location;
   comparing the particular credential data of the particular geographic location with the credential of the client device;
   based on comparing the particular credential data of the particular geographic location with the credential of the client device, determining that the credential of the client device does not correspond to one of the one or more credentials of the particular credential data of the particular geographic location;
   based on determining that the credential of the client device does not correspond to one of the one or more credentials of the particular credential data of the particular geographic location, identifying a supervisor credential that was issued by the credential granting authority and that identifies a supervisor of the user;
   identifying a supervisor client device that is associated with the supervisor credential;
   generating a warning message that includes a selectable user interface element that, upon selection, initiates addition of the credential of the client device to the particular credential data of the particular geographic location;
   sending the warning message to the supervisor client device;
   receiving, from the supervisor client device, selection data indicating a selection of the selectable user interface element; and
   in response to receiving, from the supervisor client device, the selection data indicating the selection of the selectable user interface element, adding, to the particular credential data of the particular geographic location, of the client device.

2. The method of claim 1, wherein the warning message includes an additional selectable user interface element that, upon selection, is configured to initiate communication between the supervisor client device and the client device.

3. The method of claim 1, wherein adding, to the particular credential data of the particular geographic location, the credential of the client device:
adding timing data indicating that the credential of the client device is included in the particular credential data of the particular geographic location during a time range that includes a current time.

4. The method of claim 1, wherein:
the known location data includes a time range and the credential data that indicates one or more credentials that are associated with each of the geographic locations during the time range and the method further comprises:
determining that a current time is within the time range, wherein determining that the credential of the client device does not correspond one or the one or more credentials of the particular credential data of the particular geographic location is based further on determining that the current time is outside the time range.

5. The method of claim 1, wherein the credential granting authority is an employer of the user and the supervisor.

6. The method of claim 1, comprising:
generating a log entry that indicates presence of the credential of the client device at the current geographic location of the client device.

7. The method of claim 1, comprising:
based on determining that the credential of the client device does not correspond to one of the one or more credentials of the particular credential data of the particular geographic location, sending, to the client device associated with the credential, an additional warning message that indicates that the credential of the client device is not included in one of the one or more credentials of the particular credential data of the particular geographic location.

8. The method of claim 1, comprising:
receiving, from the client device associated with the credential, data indicating a user selection of a user selectable option that, upon selection, causes the client device associated with the credential to transmit a geographic location of the client device,
wherein determining to track the location information of the client device associated with a credential is based on receiving the data indicating the user selection of the user selectable option that, upon selection, causes the client device associated with the credential to transmit a geographic location of the client device.

9. A system comprising:
one or more computers and one or more storage devices storing instructions that are operable, when executed by the one or more computers, to cause the one or more computers to perform operations comprising:
determining to track location information of a client device associated with a credential, the credential having been granted to a user of the client device by a credential granting authority to indicate a status of the user with the credential granting authority;
maintaining known location data that indicates (i) geographic locations and (ii) credential data that indicates one or more credentials that are associated with each of the geographic locations;
determining a current geographic location of the client device associated with the credential;
comparing the current geographic location of the client device associated with the credential with the known location data;
based on comparing the current geographic location of the client device associated with the credential with the known location data, determining that the current geographic location of the client device associated with the credential matches a particular geographic location included in the known location data;
accessing, from the known location data, particular credential data that indicates one or more credentials that are associated with the particular geographic location;
comparing the particular credential data of the particular geographic location with the credential of the client device;
based on comparing the particular credential data of the particular geographic location with the credential of the client device, determining that the credential of the client device does not correspond to one of the one or more credentials of the particular credential data of the particular geographic location;
based on determining that the credential of the client device does not correspond to one of the one or more credentials of the particular credential permitted data of the particular geographic location, identifying a supervisor credential that was issued by the credential granting authority and that identifies a supervisor of the user;
identifying a supervisor client device that is associated with the supervisor credential;
generating a warning message that includes a selectable user interface element that, upon selection, initiates addition of the credential of the client device to the particular credential data of the particular geographic location;
sending the warning message to the supervisor client device;
receiving, from the supervisor client device, selection data indicating a selection of the selectable user interface element; and
in response to receiving, from the supervisor client device, the selection data indicating the selection of the selectable user interface element, adding, to the particular credential data of the particular geographic location, the credential of the client device.

10. The system of claim 9, wherein the warning message includes an additional selectable user interface element that, upon selection, is configured to initiate communication between the supervisor client device and the client device.

11. The system of claim 9, wherein adding, to the particular credential data of the particular geographic location, the credential of the client device:
adding timing data indicating that the credential of the client device is included in the particular credential data of the particular geographic location during a time range that includes a current time.

12. The system of claim 9, wherein:
the known location data includes a time range and the credential data that indicates one or more credentials that are associated with each of the geographic locations during the time range and the method further comprises:
determining that a current time is within the time range, wherein determining that the credential of the client device does not correspond one or the one or more credentials of the particular credential data of the particular geographic location is based further on determining that the current time is outside the time range.

13. The system of claim 9, wherein the credential granting authority is an employer of the user and the supervisor.

14. The system of claim 9, wherein the operations further comprise:
   generating a log entry that indicates presence of the credential of the client device at the current geographic location of the client device.

15. The system of claim 9, wherein the operations further comprise:
   based on determining that the credential of the client device does not correspond to one of the one or more credentials of the particular credential data of the particular geographic location, sending, to the client device associated with the credential, an additional warning message that indicates that the credential of the client device is not included in one of the one or more credentials of the particular credential data of the particular geographic location.

16. A non-transitory computer-readable medium storing software comprising instructions executable by one or more computers which, upon such execution, cause the one or more computers to perform operations comprising:
   determining to track location information of a client device associated with a credential, the credential having been granted to a user of the client device by a credential granting authority to indicate a status of the user with the credential granting authority;
   maintaining known location data that indicates (i) geographic locations and (ii) credential data that indicates one or more credentials that are associated with each of the geographic locations;
   determining a current geographic location of the client device associated with the credential;
   comparing the current geographic location of the client device associated with the credential with the known location data;
   based on comparing the current geographic location of the client device associated with the credential with the known location data, determining that the current geographic location of the client device associated with the credential matches a particular geographic location included in the known location data;
   accessing, from the known location data, particular credential data that indicates one or more credentials that are associated with the particular geographic location;
   comparing the particular credential data of the particular geographic location with the credential of the client device;
   based on comparing the particular credential data of the particular geographic location with the credential of the client device, determining that the credential of the client device does not correspond to one of the one or more credentials of the particular credential data of the particular geographic location;
   based on determining that the credential of the client device does not correspond to one of the one or more credentials of the particular credential data of the particular geographic location, identifying a supervisor credential that was issued by the credential granting authority and that identifies a supervisor of the user;
   identifying a supervisor client device that is associated with the supervisor credential;
   generating a warning message that includes a selectable user interface element that, upon selection, initiates addition of the credential of the client device to the particular credential data of the particular geographic location;
   sending the warning message to the supervisor client device;
   receiving, from the supervisor client device, selection data indicating a selection of the selectable user interface element; and
   in response to receiving, from the supervisor client device, the selection data indicating the selection of the selectable user interface element, adding, to the particular credential data of the particular geographic location, the credential of the client device.

17. The medium of claim 16, wherein the warning message includes an additional selectable user interface element that, upon selection, is configured to initiate communication between the supervisor client device and the client device.

18. The medium of claim 16, wherein:
   the known location data includes a time range and the credential data that indicates one or more credentials that are associated with each of the geographic locations during the time range and the method further comprises:
      determining that a current time is within the time range, wherein determining that the credential of the client device does not correspond one or the one or more credentials of the particular credential data of the particular geographic location is based further on determining that the current time is outside the time range.

* * * * *

UNITED STATES PATENT AND TRADEMARK OFFICE
CERTIFICATE OF CORRECTION

PATENT NO. : 10,021,106 B1
APPLICATION NO. : 15/080126
DATED : July 10, 2018
INVENTOR(S) : Michael J. Saylor and Gang Chen Page 1 of 1

It is certified that error appears in the above-identified patent and that said Letters Patent is hereby corrected as shown below:

In the Claims

In Column 24, Line 63, Claim 1, after "location," insert -- the credential --.

In Column 26, Line 22, Claim 9, after "particular credential" delete "permitted".

Signed and Sealed this
Sixteenth Day of October, 2018

Andrei Iancu
*Director of the United States Patent and Trademark Office*